(12) United States Patent
Watanabe et al.

(10) Patent No.: US 6,338,331 B1
(45) Date of Patent: Jan. 15, 2002

(54) INTAKE AIR CONTROL SYSTEM FOR INTERNAL COMBUSTION ENGINE

(75) Inventors: Satoru Watanabe, Susono; Hiroki Ichinose, Fuji; Masanobu Kanamaru, Misima; Yasuyuki Irisawa, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/493,602

(22) Filed: Jan. 28, 2000

(30) Foreign Application Priority Data

| Jan. 29, 1999 | (JP) | 11-022140 |
| Feb. 12, 1999 | (JP) | 11-034266 |
| Feb. 12, 1999 | (JP) | 11-034271 |
| Mar. 8, 1999 | (JP) | 11-060341 |
| Mar. 11, 1999 | (JP) | 11-064880 |

(51) Int. Cl.$^7$ ............................. F02D 9/02; F02D 41/06
(52) U.S. Cl. ................... 123/399; 123/179.18; 123/491
(58) Field of Search ..................... 123/179.18, 337, 123/399, 491

(56) References Cited

U.S. PATENT DOCUMENTS

| 4,467,601 A | * | 8/1984 | Watanabe | ............... 123/399 X |
| 4,475,381 A | * | 10/1984 | Nakatomi et al. | ....... 123/494 X |
| 5,542,388 A | * | 8/1996 | Ichinose et al. | ..... 123/179.18 X |
| 5,596,957 A | | 1/1997 | Ichinose et al. | ....... 123/179.18 |
| 5,722,365 A | * | 3/1998 | Sadakane et al. | ....... 123/491 X |
| 5,826,564 A | * | 10/1998 | Fuwa et al. | .................. 123/491 |
| 5,915,362 A | | 6/1999 | Fuwa et al. | .................. 123/491 |

FOREIGN PATENT DOCUMENTS

| JP | 61-96147 | 5/1986 |
| JP | 63-105254 | 5/1988 |
| JP | 63-150445 | 6/1988 |
| JP | 6-37859 | 5/1994 |
| JP | 8-109836 | 4/1996 |
| JP | 9-4474 | 1/1997 |
| JP | 9-324677 | 12/1997 |

\* cited by examiner

*Primary Examiner*—Tony M. Argenbright
(74) *Attorney, Agent, or Firm*—Oblon, Spivak, McClelland, Maier & Neustadt, P.C.

(57) ABSTRACT

An internal combustion engine having an intake passage that is closed at the time of engine starting operation wherein a holding time for completely closing a throttle valve is made as long as possible within such a range that the engine does not fail to be started. The throttle valve is held at its full-closure position when an ignition switch is turned on. Then, at the time of engine starting operation, an amount of air consumed by the engine is calculated based on a cumulative rotational speed of the engine, a cylinder volume of the engine, and a parameter of volumetric efficiency corresponding to an engine rotational speed, and, if so, the throttle valve is opened to a predetermined opening degree.

20 Claims, 28 Drawing Sheets

$$R = \frac{\Sigma U}{Vvol}$$

$(0 \leqq R \leqq 1)$

INTAKE AIR CONTROL SYSTEM FOR INTERNAL COMBUSTION ENGINE

INCORPORATION BY REFERENCE

The disclosures of Japanese Patent Application Nos. HEI 11-22140 filed on Jan. 29, 1999, HEI 11-34266 filed on Feb. 12, 1999, HEI 11-34271 filed on Feb. 12, 1999, HEI 11-60341 filed on Mar. 8, 1999 and HEI 11-64880 filed on Mar. 11, 1999 including the specifications, drawings and abstracts are incorporated herein by reference in their entirety.

BACKGROUND OF THE INVENTION

1. Field of the Invention

The present invention relates to an intake air control system for an internal combustion engine and, more particularly, to an intake air control system designed for engine starting operation in an internal combustion engine employing an electronically controlled throttle valve whose opening degree is set independently of a depression amount of an accelerator pedal.

2. Description of the Related Art

With the development of computer technology in recent years, there is proposed an electronically controlled internal combustion engine whose rotational speed is electronically controlled optimally. In an internal combustion engine having a throttle valve whose opening degree is electronically controlled, the opening degree of the throttle valve can be set regardless of a depression amount of an accelerator pedal.

In an electronically controlled internal combustion engine, since a fuel injection valve is attached to the interior of an intake passage in the vicinity of each combustion chamber, there is a possibility that fuel may not be atomized sufficiently at the time of engine starting operation. In order to prevent deterioration of startability of the engine in such a case, it has been proposed to reduce an amount of intake air and enhance a negative pressure in an intake pipe by closing the intake passage by means of an electronically controlled throttle valve at the time of engine starting operation, and to thereby promote atomization of fuel (as disclosed, for example, in Japanese Patent Application Laid-Open No. SHO 61-96147, Japanese Patent Application Laid-Open No. SHO 63-150445 and the like).

In the art disclosed in the aforementioned publications, the effect of reducing concentrations of emission substances (inhibiting unburnt hydrocarbon from being discharged) can be achieved through promotion of atomization of fuel. However, since the engine starting operation is performed with the throttle valve being completely closed, the amount of intake air becomes insufficient after the air downstream of the throttle valve has been consumed. This tends to cause deterioration of startability of the engine.

SUMMARY OF THE INVENTION

It is an object of the present invention to provide an intake air control system capable of holding an electronically controlled throttle valve completely open within such a range that an internal combustion engine does not fail to be started due to a deficiency in amount of intake air, and of achieving both reduction of concentrations of emission substances and improvement in startability of the engine, by opening the throttle valve at an appropriate timing after a full-closure state of the throttle valve at the time of engine starting operation, in the internal combustion engine having the throttle valve wherein a negative pressure in an intake pipe is increased by closing an intake passage at the time of engine starting operation so as to promote atomization of fuel.

In order to achieve the above-stated object, according to one aspect of the present invention, there is provided an intake air control system for controlling an amount of air supplied to an internal combustion engine by adjusting an opening degree of an electronically controlled throttle valve provided in an intake passage of the internal combustion engine, comprising a throttle valve controller that closes the electronically controlled throttle valve to its full-closure position when an ignition switch of the internal combustion engine is turned on and opens the throttle valve after air has been sucked into the internal combustion engine, and an air amount determiner that determines an amount of air used for combustion in the internal combustion engine. The throttle valve controller opens the throttle valve to a predetermined opening degree when the amount of air reaches a predetermined amount.

This construction makes it possible to perform opening control of the electronically controlled throttle valve at an appropriate timing. Therefore, the throttle valve can be held completely closed within such a range that the engine does not fail to be started due to a deficiency in intake air in the engine, and it is possible to achieve both reduction of concentrations of emission substances and improvement in startability of the engine.

BRIEF DESCRIPTION OF THE DRAWINGS

The foregoing and further objects, features and advantages of the present invention will become apparent from the following description of preferred embodiments with reference to the accompanying drawings, wherein.

DESCRIPTION OF PREFERRED EMBODIMENTS

Preferred embodiments of the present invention will be described hereinafter with reference to drawings.

Figure 1:
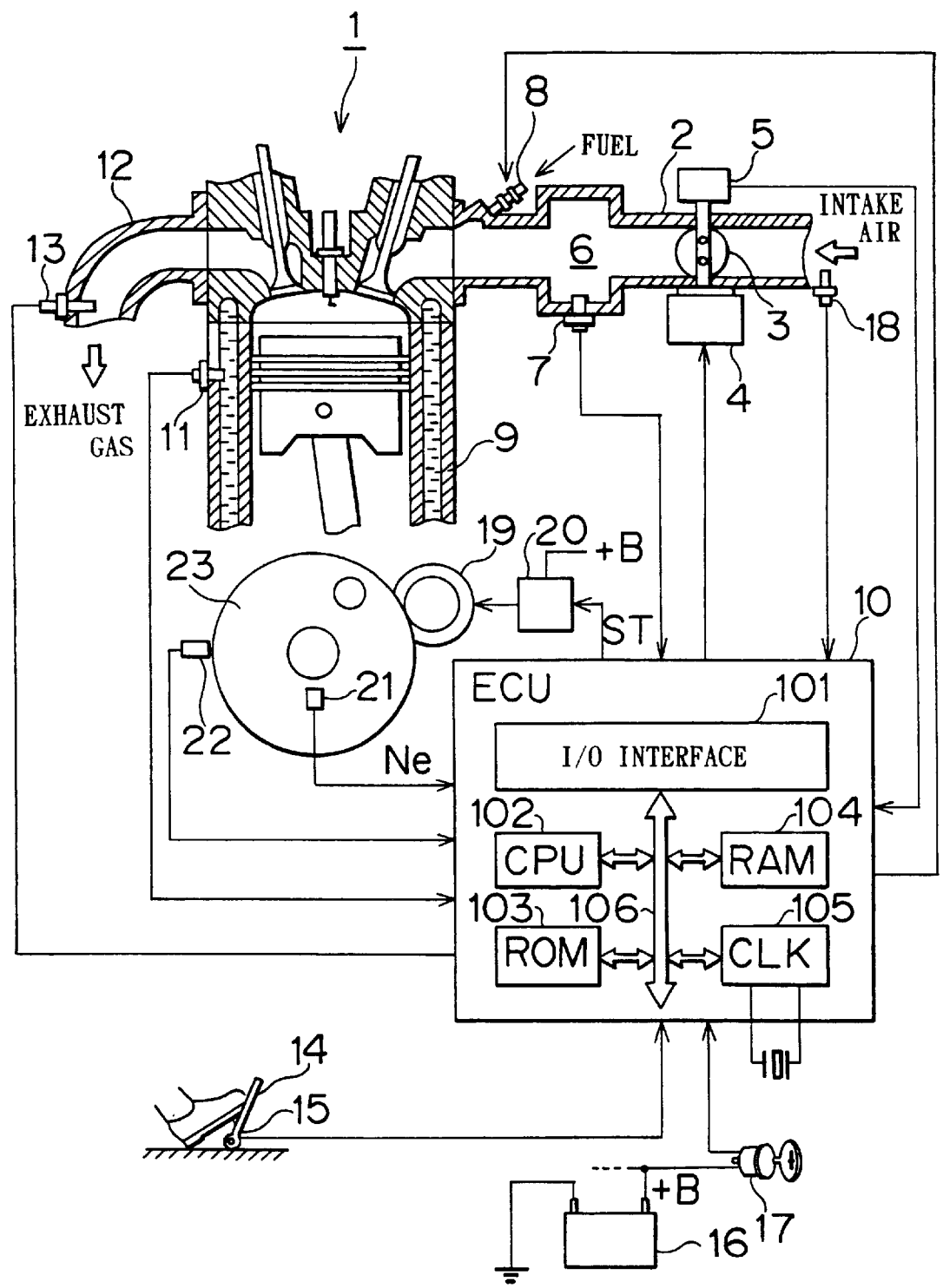
FIG. 1 is a structural view of an electronically controlled multi-cylinder internal combustion engine in which an intake air control system of the present invention is installed.

FIG. 1 schematically shows a multi-cylinder internal combustion engine of electronically controlled fuel injection type in which an intake air control system of the present invention is installed. In an intake passage 2 of the internal combustion engine 1, a throttle valve 3 is provided downstream of an air cleaner (not shown). A throttle motor 4, which is an actuator for driving the throttle valve 3, is provided at one end of a shaft of the throttle valve 3. A throttle opening degree sensor 5 for detecting an opening degree of the throttle valve 3 is provided at the other end of the shaft of the throttle valve 3. That is, the throttle valve 3 is an electronic control throttle (hereinafter referred to simply as an electronic throttle) that is driven to be opened and closed by the throttle motor 4. If a command value for the opening degree of the throttle valve 3 is inputted to the throttle motor 4, the throttle motor 4 causes the opening degree of the throttle valve 3 to approach the opening degree corresponding to the command value.

An atmospheric pressure sensor 18 is disposed upstream of the throttle valve 3 in the intake passage 2, and a surge tank 6 is disposed downstream of the throttle valve 3 in the intake passage 2. A pressure sensor 7 for detecting a pressure of intake air is provided in the surge tank 6. Furthermore, for each cylinder, a fuel injection valve 8 for feeding pressurized fuel to an intake port from a fuel feed system is provided downstream of the surge tank 6. Outputs from the throttle opening degree sensor 5 and the pressure sensor 7 are inputted to an ECU (engine control unit) 10 in which a microcomputer is installed.

A coolant temperature sensor 11 for detecting a coolant temperature is provided in a coolant passage of a cylinder block of the internal combustion engine 1. The coolant temperature sensor 11 generates an electric signal of an analog voltage corresponding to the coolant temperature. A three-way catalytic converter (not shown), which simultaneously purifies noxious substances contained in exhaust gas such as hydrocarbon HC, carbon monoxide CO and nitrogen oxide NOx, is provided in an exhaust passage 12. An $O_2$ sensor 13, which is an air-fuel ratio sensor, is provided upstream of the catalytic converter in the exhaust passage 12. The $O_2$ sensor 13 generates an electric signal in accordance with a concentration of oxygen in exhaust gas. Outputs from the coolant temperature sensor 11 and the $O_2$ sensor 13 are inputted to the ECU 10.

Furthermore, an accelerator pedal depression amount signal (an accelerator opening degree signal) from an accelerator opening degree sensor 15 that is attached to an accelerator pedal 14 to detect a depression amount thereof, a key-position signal (an accessory position, an ON-position and a starter position) from an ignition switch 17 connected to a battery 16, an engine rotational speed Ne from a rotational speed sensor 21 for detecting a rotational speed of a ring gear 23, and a temperature of lubricating oil from an oil temperature sensor 22 are inputted to the ECU 10. When the engine 1 is started, a starter 19 causes the ring gear 23 to rotate.

In a generally employed internal combustion engine, the starter 19, which is generally composed of a direct-current series-wound motor, is connected to the battery 16 through a starter switch that is turned on when the ignition switch 17 is switched to the starter position. Accordingly, if the ignition switch 17 has been turned on and thereafter switched to the starter position, the starter 19 is activated and the engine 1 is activated. Then, if the engine 1 has started operating, the ECU 10 is supplied with electric power, starts executing its program and receives outputs from the respective sensors. The ECU 10 then controls the throttle motor 4 for opening and closing the throttle valve 3, the fuel injection valve 8 or other actuators. The ECU 10 includes an A/D converter for converting analog signals from the respective sensors to digital signals. The ECU 10 is provided with an I/O interface 101 to which input digital signals from the respective sensors are inputted and from which signals for driving the respective actuators are outputted, a CPU 102 for performing arithmetic processings, memories such as a ROM 103 and a RAM 104, a clock 105 and the like. These components are interconnected to one another by a bus 106.

In the present embodiment, the starter 19 is connected to a B+ terminal of the battery 16 through a starter driving circuit 20. Unless a starter signal ST from the ECU 10 is inputted to the starter driving circuit 20, the starter driving circuit 20 prohibits the starter 19 from being connected to the battery 16.

In the present embodiment, the intake passage 2 is closed by temporarily closing the throttle valve 3 when starting the engine 1, so as to generate a negative pressure downstream of the throttle valve 3 and to thereby improve startability of the engine.

While the engine 1 is stopped, the throttle valve 3 is not completely closed but slightly open and the intake passage 2 of the throttle valve 3 is therefore at an atmospheric pressure. For this reason, when starting the engine 1, the starter 19 is caused to rotate after the throttle valve 3 has been switched to its full-closure position by driving the throttle motor 4.

The full-closure position of the throttle valve 3 does not represent a state where the throttle valve 3 is completely in contact with the intake passage 2 but a position where a narrow gap (through which a minimum ISC [idle speed control] flow rate $ISC_{min}$ of air can flow) is formed between the throttle valve 3 and the intake passage 2.

As described above, the key-position signal from the ignition switch 17 and the throttle opening degree signal from the throttle opening degree sensor 5 are inputted to the ECU 10. In the present embodiment, the starter signal ST from the ECU 10 is inputted to the starter driving circuit 20 only if both the starter position signal from the ignition switch 17 and a throttle full-closure signal from the throttle opening degree sensor 5 have been inputted to the ECU 10.

A control procedure for opening the throttle valve 3 that has been completely closed since the starting of the engine 1 will be described with reference to flowcharts of some embodiments. In the embodiments that will be described below, after the ignition switch 17 has been turned on as described above, the starter signal ST is outputted to the starter driving circuit 20 only after attainment of the full-closure position by the throttle valve 3. The starter 19 then starts its operation.

Figure 2:
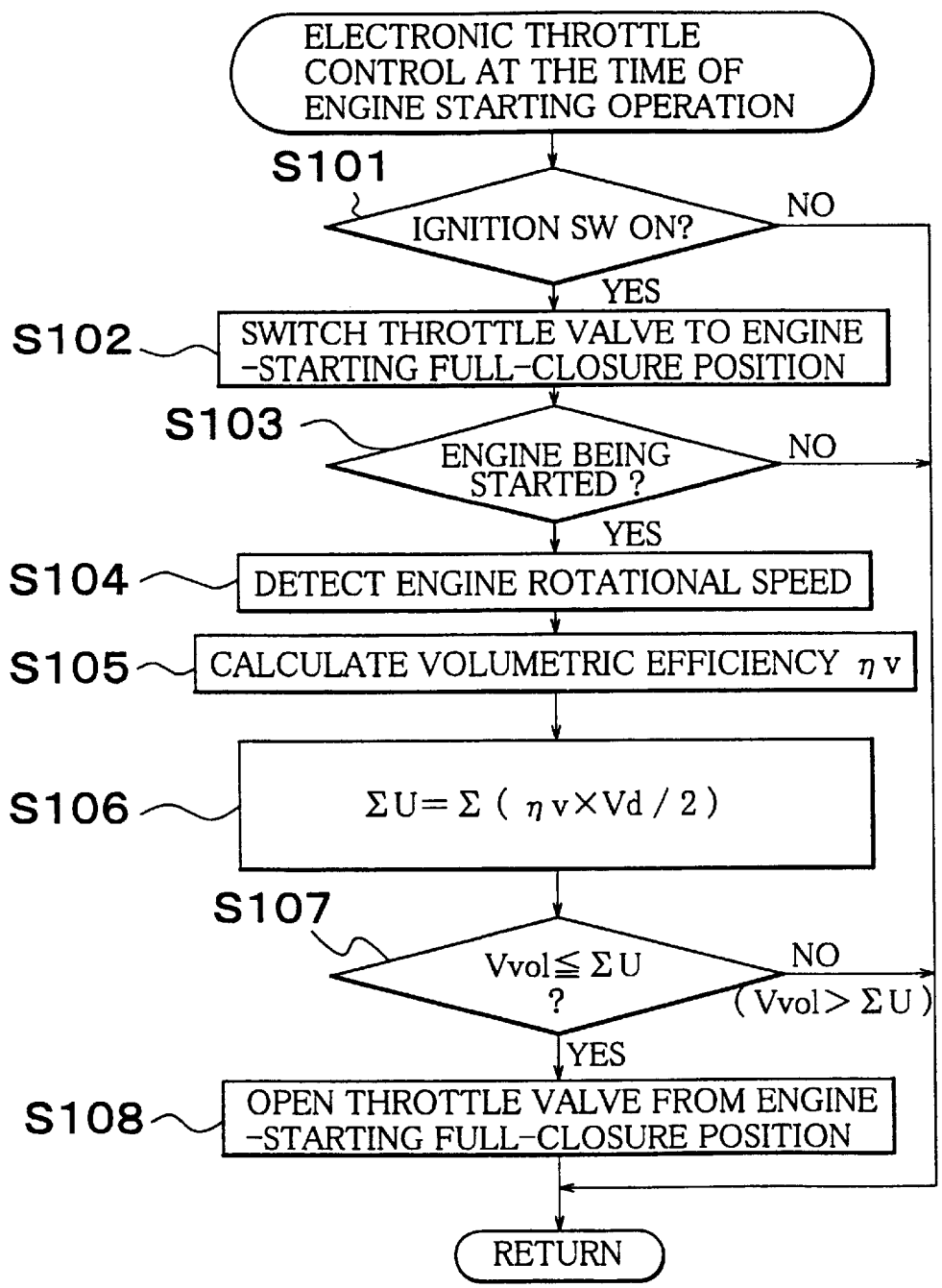
FIG. 2 is a flowchart showing how to control an electronically controlled throttle valve at the time of engine starting operation.

FIG. 2 is a flowchart showing a first embodiment of a control procedure for opening the throttle valve 3 that has been completely closed since the starting of the engine 1. The routine shown in this flowchart is carried out at intervals of a predetermined length of time, for example, several milliseconds.

First of all, in step S101, it is determined whether or not the ignition switch 17 has been turned on, namely, whether or not an ON-signal has been inputted to the ECU 10 from the ignition switch 17. If the ignition switch 17 has not been turned on, the routine is terminated without performing any other processings. On the other hand, if it is determined that the ignition switch 17 has been turned on, the operation proceeds to step S102.

In step S102, the throttle motor 4 controls the throttle valve 3 such that the throttle valve 3 assumes its full-closure position at the time of engine starting operation. Then in step S103, it is detected whether or not the engine 1 is about to be started, namely, whether or not the starter 19 is in operation. If the starter 19 is not in operation, the routine is terminated. If the starter 19 is in operation, the engine 1 is also in operation. Therefore, the operation proceeds to step S104.

In step S104, a rotational speed of the engine 1 is detected. Then in the following step S105, a volumetric efficiency $\eta v$ used for calculation of an amount of consumed air is calculated from an engine rotational speed map preliminarily stored in the ROM 103 of the ECU 10, based on the detected rotational speed of the engine 1. The volumetric efficiency $\eta v$ represents the ratio of an amount of air sucked to a volume of a combustion chamber. The higher the engine rotational speed becomes, the smaller the volumetric efficiency $\eta v$ becomes. After the volumetric efficiency $\eta v$ has thus been calculated, an amount U of consumed air is calculated in step S106 every time the engine 1 rotates by one revolution. The amounts U of consumed air are cumulated so as to calculate an amount of air (a cumulative consumed air amount) $\Sigma U$ that has been sucked into the combustion chamber after the engine starting operation. While the crank shaft rotates by one revolution, half of the cylinders in the internal combustion engine undergo an intake stroke. Accordingly, the amount of air consumed during one revolution of the engine 1 is half of a cylinder volume Vd of the engine 1. Thus, the amount of air $\Sigma U$ sucked into the combustion chamber after the starting of the engine 1 is a cumulative result of a value $(U=\eta v \times Vd \times \frac{1}{2})$ that has been multiplied by half of the cylinder volume Vd of the engine 1 every revolution of the engine 1 and further multiplied by the volumetric efficiency $\eta v$.

That is, the cumulative consumed air amount $\Sigma U$ is calculated according to a formula (1) shown below.

$$\Sigma U = \Sigma(\eta v \times Vd \times \tfrac{1}{2}) \tag{1}$$

The aforementioned cumulative consumed air amount $\Sigma U$ may be corrected based on an intake air temperature.

In the following step S107, it is determined whether or not the cumulative consumed air amount $\Sigma U$ has become equal to or greater than a volume Vvol of the intake passage 2 downstream of the throttle valve 3. If $Vvol > \Sigma U$, it is determined that the amount of air corresponding to the volume Vvol of the intake passage 2 downstream of the throttle valve 3 has not been consumed yet, and the routine is terminated without performing any other processings. On the other hand, if $Vvol \leq \Sigma U$, it is determined that the amount of air corresponding to the volume of the intake passage 2 downstream of the throttle valve 3 has all been consumed, and the operation proceeds to step S108. In step S108, the throttle valve 3 is opened from its engine-starting full-closure position to a predetermined opening degree, and the routine is terminated.

Figure 3:
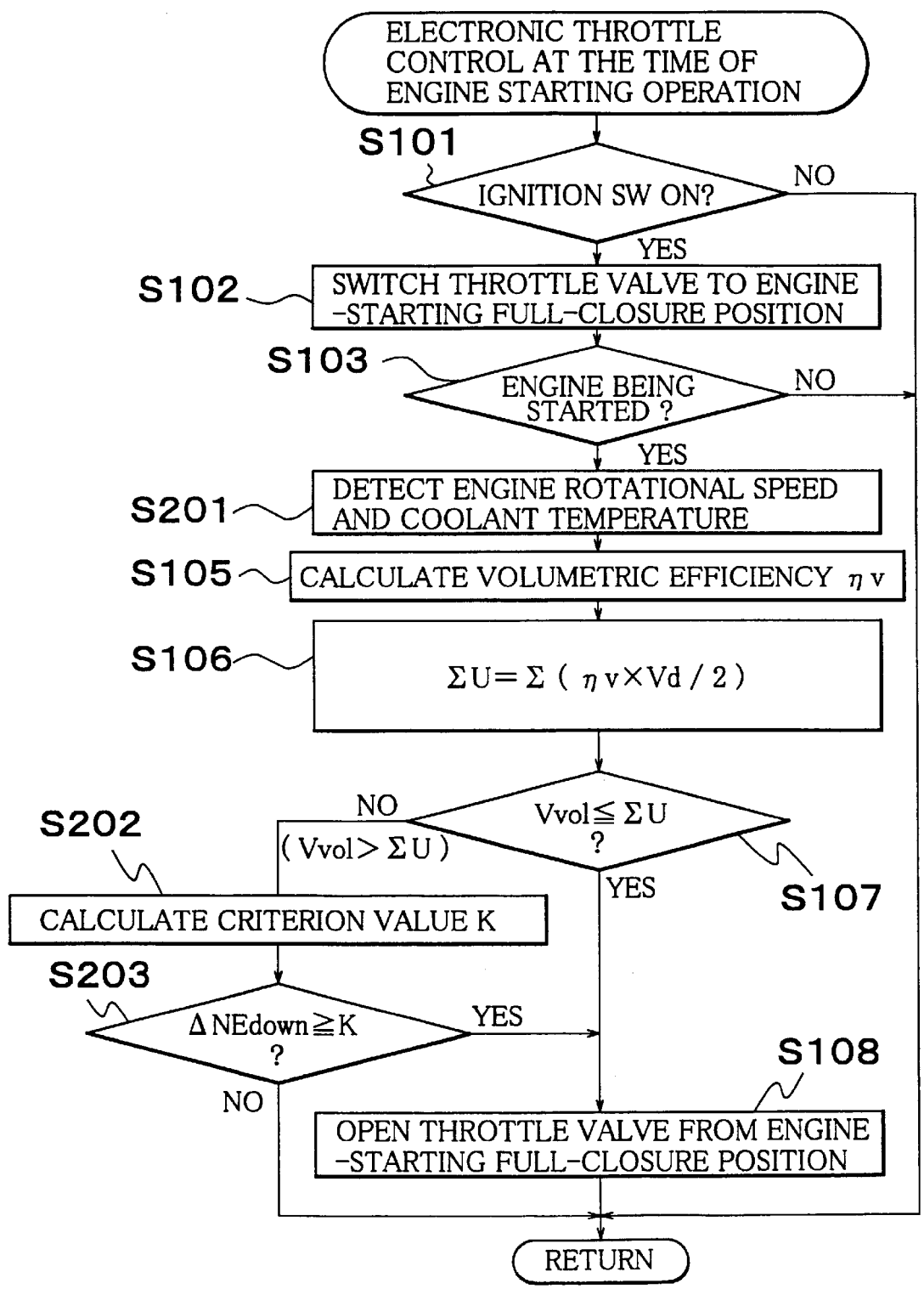
FIG. 3 is a flowchart showing how to control the electronically controlled throttle valve at the time of engine starting operation.

FIG. 3 is a flowchart showing a second embodiment of a control procedure for opening the throttle valve 3 that has been completely closed since the starting of the engine 1. The routine shown in this flowchart is also carried out at intervals of a predetermined length of time, for example, several milliseconds.

In the control of the second embodiment, control performed in case of a sudden drop in rotational speed of the engine 1 at the time of engine starting operation is added to the control procedure for opening the throttle valve 3 according to the first embodiment described with reference to FIG. 2. Accordingly, in the following description of the control procedure of the second embodiment, only what is different from the first embodiment will be described.

In the second embodiment, instead of step S104, a coolant temperature of the engine, which is regarded as a temperature of the engine, is detected together with an engine rotational speed in step S201.

In the first embodiment, if Vvol>ΣU (NO) in step S107, the routine is terminated without performing any other processings. However, in the second embodiment, if Vvol>ΣU, the operation proceeds to step S202. In step 302, a criterion value K for a drop rate ΔNEdown of the engine rotational speed is calculated from a coolant temperature map stored in the ROM 103 of the ECU 10.

Figure 4:
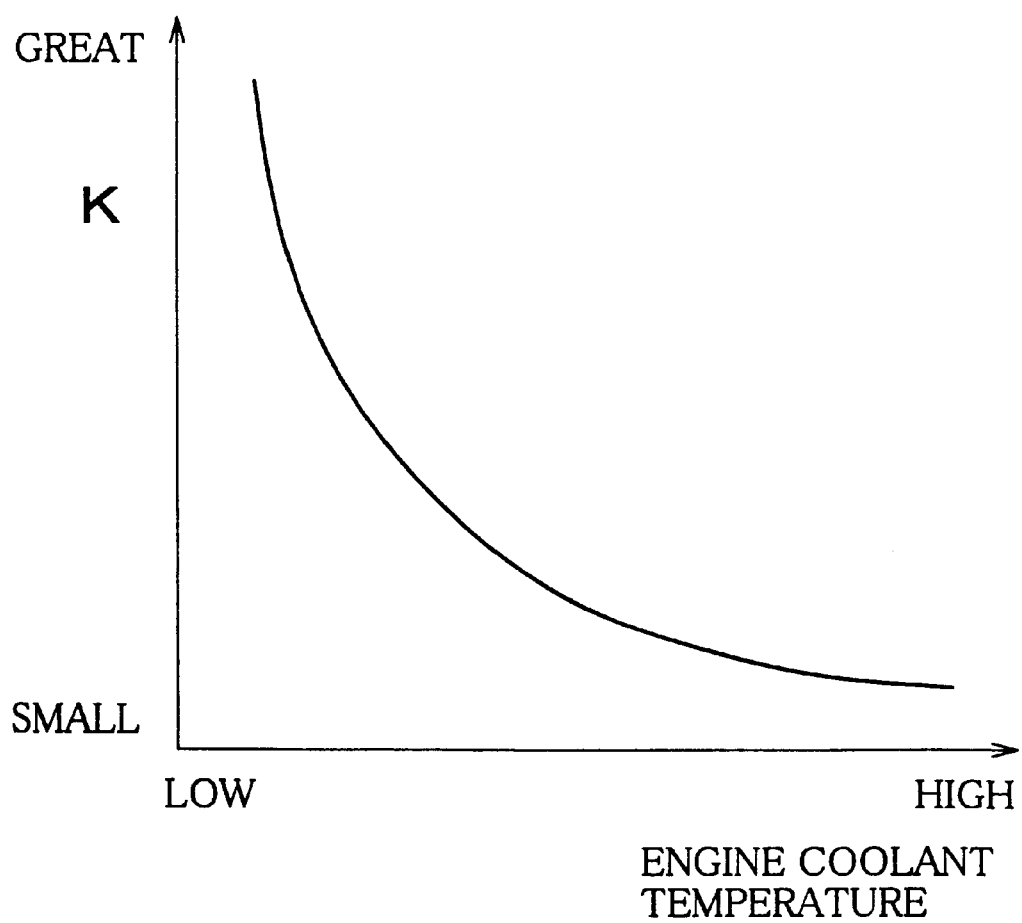
FIG. 4 is a characteristic diagram showing how a criterion value for a drop rate of engine rotational speed used in the flowchart in FIG. 3 changes in accordance with a coolant temperature.

The drop rate ΔNEdown of the engine rotational speed represents a degree of drop in engine rotational speed NE within a predetermined length of time. The lower the coolant temperature of the engine is, the more drastically the engine rotational speed NE drops within the predetermined length of time. Thus, the criterion value K needs to be increased in accordance with a decrease in coolant temperature of the engine. FIG. 4 shows an example of a coolant temperature map stored in the ROM 103 of the ECU 10. As can be seen from this map, the higher the engine coolant temperature is, the smaller the criterion value K for the drop rate ΔNEdown of the engine rotational speed is made.

After the criterion value K for the drop rate ΔNEdown of the engine rotational speed has thus been calculated, it is determined in step S203 whether or not the actual drop rate ΔNEdown of the engine rotational speed is equal to or higher than the criterion value K calculated in step S202. If ΔNEdown<K in step S203, the routine is terminated without performing any other processings. If ΔNEdown≧K in step S203, the operation proceeds to step S108. Further, if Vvol≦ΣU in step S107, the same as in the first embodiment holds true. That is, it is determined that the amount of air corresponding to the volume of the intake passage 2 downstream of the throttle valve 3 has all been consumed, and the operation proceeds to step S108. The throttle valve 3 is then opened from its engine-starting full-closure position to a predetermined opening degree, and the routine is terminated.

Figure 5:
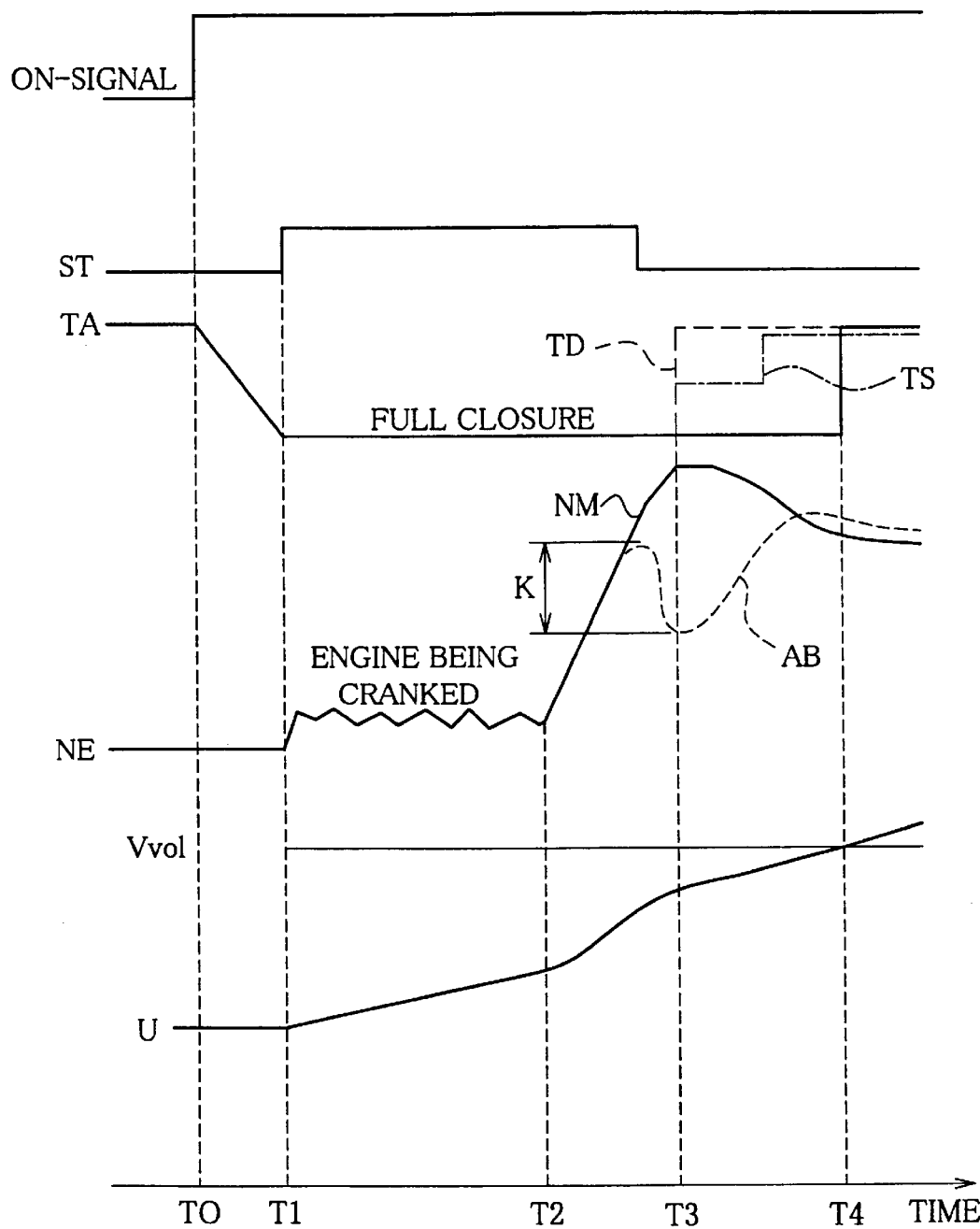
FIG. 5 is a time chart showing how an ON-position signal of an ignition switch, a starter position signal, a starter signal to a starter, a throttle opening degree, an engine rotational speed and an amount of air consumed by the engine change with the lapse of time.

FIG. 5 is a time chart showing how the ON-position signal of the ignition switch, the starter signal ST from the ECU 10, a throttle opening degree TA as an opening degree of the throttle valve 3, the engine rotational speed NE and an amount U of air consumed by the engine 1 change with the lapse of time, in the control procedure of the first and second embodiments described with reference to FIGS. 2 and 3.

First of all, the control procedure of the first embodiment will be described using the time chart. If it is determined in step S101 that the ignition switch 17 has been turned on, the ON-signal at a time T0 attains a high level. If the ignition switch 17 is turned on, the control in step S102 causes the throttle motor 4 to close the throttle valve 3, so that the throttle opening degree TA decreases. If the throttle valve 3 is completely closed at a time T1, the starter signal ST is outputted from the ECU 10 to the starter driving circuit 20. The starter 19 then rotates and the engine 1 enters its cranking state. At this moment, the operation proceeds from step S103 to step S104, where a cumulative rotational speed ΣNE after the engine starting operation is calculated according to the procedure in steps S104 through S106.

After the engine 1 is started at a time T2, the rotational speed of the engine 1 rises as indicated by a solid line NM, reaches a predetermined rotational speed, slightly drops and then settles down. After the time T2, an amount U of air consumed by the engine 1 continues to be calculated constantly. In the first embodiment, Vvol becomes equal to ΣU at a time T4 which is later than the time T2. Thus, through the control in step S108, the throttle valve 3 is opened from its engine-starting full-admission position, and the throttle opening degree TA increases to a predetermined opening degree, for example, an idle opening degree.

In order to explain the case of the second embodiment, it is assumed that the rotational speed of the engine 1 started at the time T2 drops as indicated by a broken line AB and that the drop rate ΔNEdown of the engine rotational speed has become equal to or higher than the criterion value K at the time T3. In the second embodiment, through the control in step S203, the throttle valve 3 is opened, and the throttle opening degree TA increases to a predetermined opening degree as indicated by a broken line TD. The throttle valve 3 may be opened to the predetermined opening degree at a breath at the time T3 or may be opened gradually as indicated by an alternate long and short dash line TS.

As described hitherto, in the first embodiment, the amount of air sucked into the combustion chamber is calculated using the cumulative rotational speed ΣNE, the volumetric efficiency ηv and the cylinder volume of the engine 1. If the amount of air corresponding to the volume of the intake passage 2 downstream of the throttle valve 3 has all been consumed, the throttle valve 3 that has been completely closed since the engine starting operation is opened. Accordingly, the throttle valve 3 can be held completely closed within such a range that the engine does not fail to be started due to a deficiency in amount of intake air in the engine. Consequently, both reduction of concentration of emission substances and enhancement of startability can be achieved.

In the control of the second embodiment, even in the case where the amount of air corresponding to the volume of the intake passage 2 downstream of the throttle valve 3 has not all been consumed, if the rotational speed of the engine 1 has dropped abruptly, the throttle valve 3 is opened so as to prevent the engine 1 from failing to be started. Therefore, even in the case where considerable friction has arisen in the engine, the engine is prevented from going into a stall or failing to be started.

Figure 6:
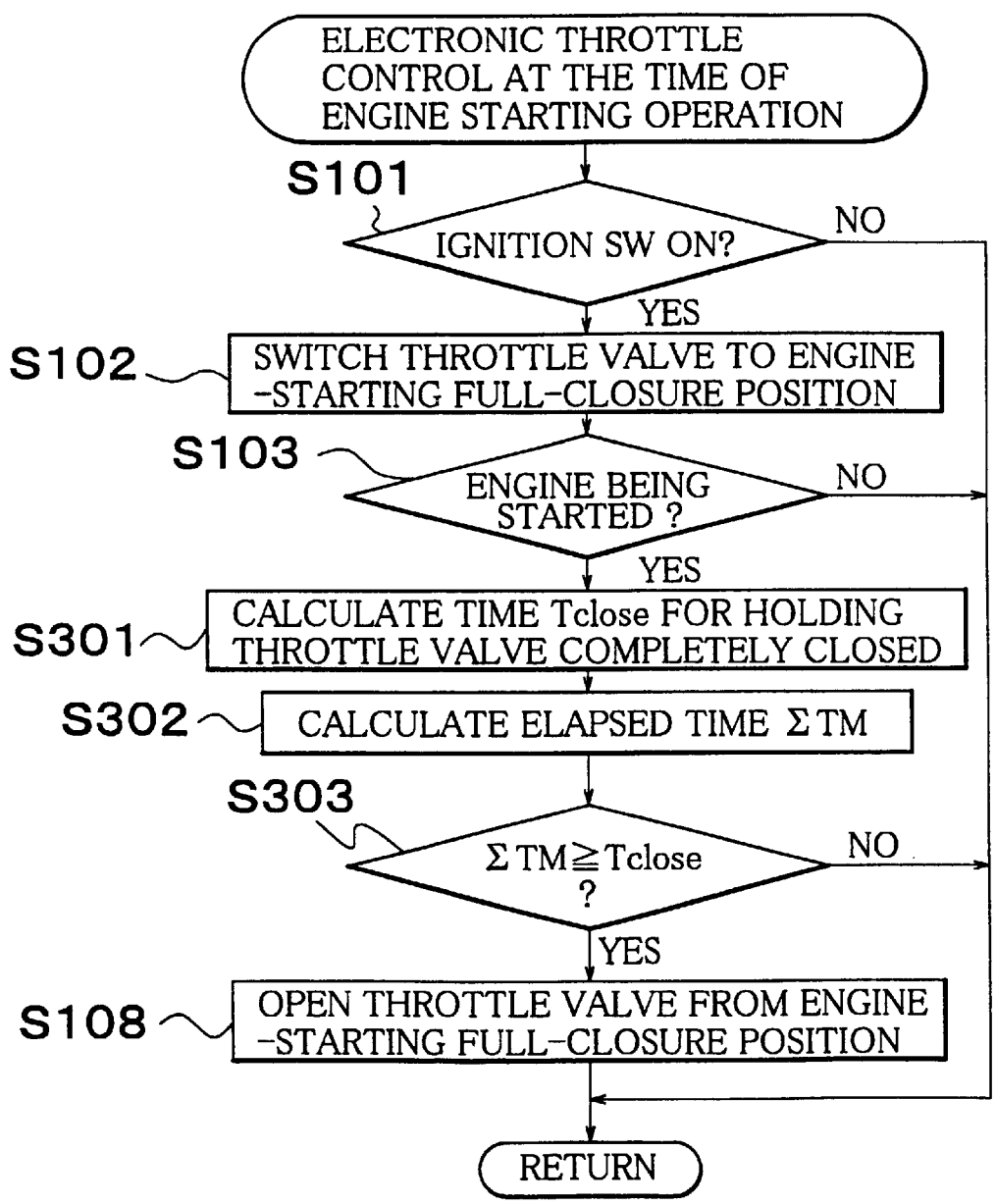
FIG. 6 is a flowchart showing how to control the electronically controlled throttle valve at the time of engine starting operation.

FIG. 6 is a flowchart showing a third embodiment of a control procedure for opening the throttle valve 3 that has been completely closed since the starting of the engine 1. The routine shown in this flowchart is also carried out at intervals of a predetermined length of time, for example, several milliseconds. In the control of the third embodiment, the throttle valve 3 is opened if a predetermined length of time has elapsed after the starting of the engine 1.

In the following description, the same control (the same step numbers) as in the aforementioned embodiments will not be mentioned.

In the third embodiment, if the result is YES in step S103 (if the starter 19 is in operation), the operation proceeds to step S301.

Figure 8A:
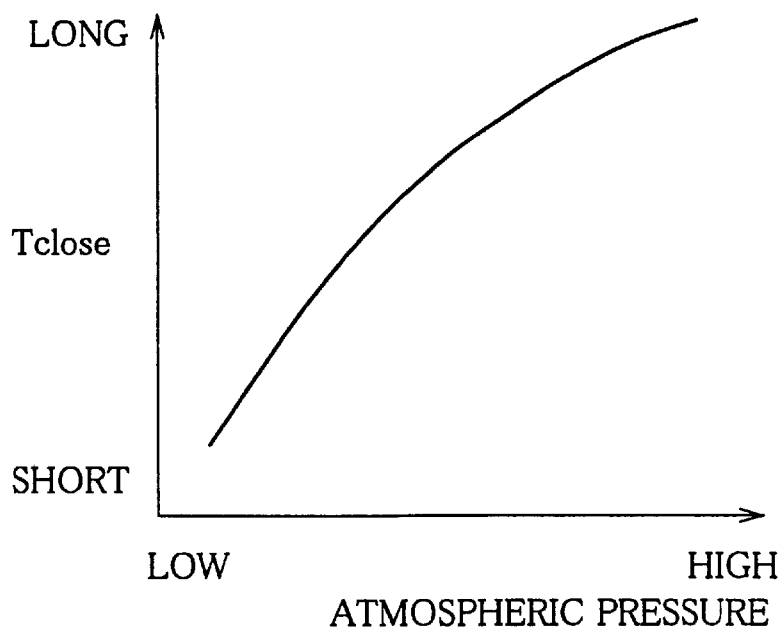
FIG. 8A is a characteristic diagram showing how a closed-state holding time for the throttle valve changes in accordance with an atmospheric pressure.
Figure 8B:
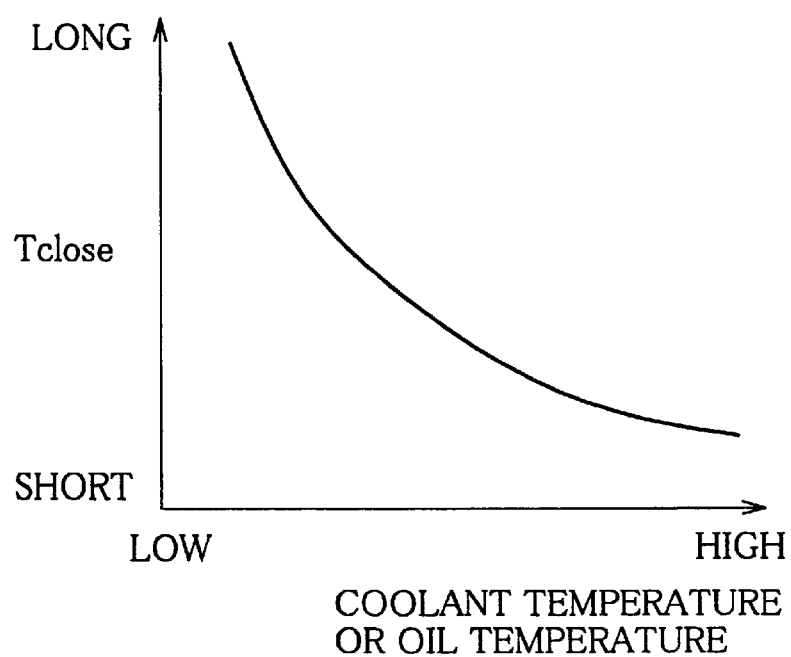
FIG. 8B is a characteristic diagram showing how the closed-state holding time for the throttle valve changes in accordance with a coolant temperature or an oil temperature.

In step S301, conditions concerning a volume of the engine 1 downstream of the throttle valve 3, a coolant temperature of the engine, a temperature of lubricating oil and an atmospheric pressure are read, and a holding time Tclose for holding the throttle valve completely closed is calculated according to those conditions. As shown in FIG. 8A, the higher the atmospheric pressure becomes, the longer the holding time Tclose is made. As shown in FIG. 8B, the higher the coolant temperature or the oil temperature becomes, the shorter the holding time Tclose is made. In the following step S302, an elapsed time ΣTM after the starting of the engine 1 is calculated.

In step S303, the elapsed time ΣTM after the starting of the engine 1 is compared with the holding time Tclose for holding the throttle valve 3 completely closed. If ΣTM<Tclose, the routine is terminated without performing any other processings. If ΣTM≦Tclose, the operation proceeds to step S108.

Figure 7:
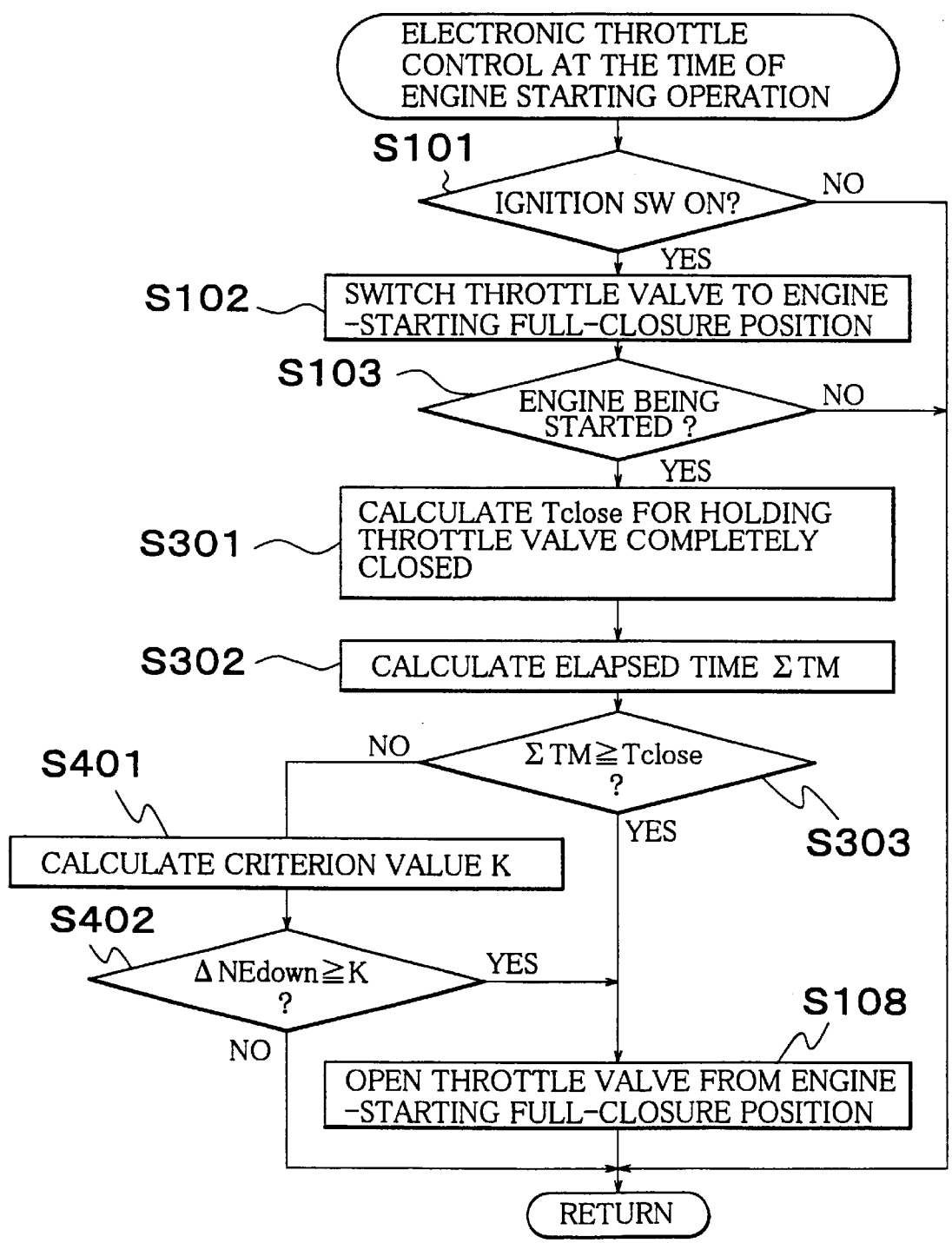
FIG. 7 is a flowchart showing how to control the electronically controlled throttle valve at the time of engine starting operation.

In a fourth embodiment shown in FIG. 7, control performed in case of a sudden drop in rotational speed of the engine 1 at the time of engine starting operation is added to the control procedure according to the third embodiment. In the following description, only what is different from the aforementioned embodiment will be explained.

In the fourth embodiment, if the result is NO (ΣTM<Tclose) in step S303, the operation proceeds to step S401. In step S401, a criterion value K for the drop rate ΔNEdown of the engine rotational speed is calculated from a coolant temperature map (the same map as in FIG. 4).

In the following step S402, it is determined whether or not the actual drop rate ΔNEdown of the engine rotational speed is equal to or higher than the criterion value K calculated in step S401. If ΔNEdown<K, the routine is terminated without performing any other processings. If ΔNEdown≧K, the operation proceeds to step S108 where the throttle valve 3 is opened from its engine-starting full-admission position to a predetermined opening degree. The routine is then terminated. If the result in step S303 is YES (ΣTM≧Tclose), the operation proceeds to step S108 where the throttle valve 3 is opened from its engine-starting full-closure position to a predetermined opening degree. The routine is then terminated.

Figure 9:
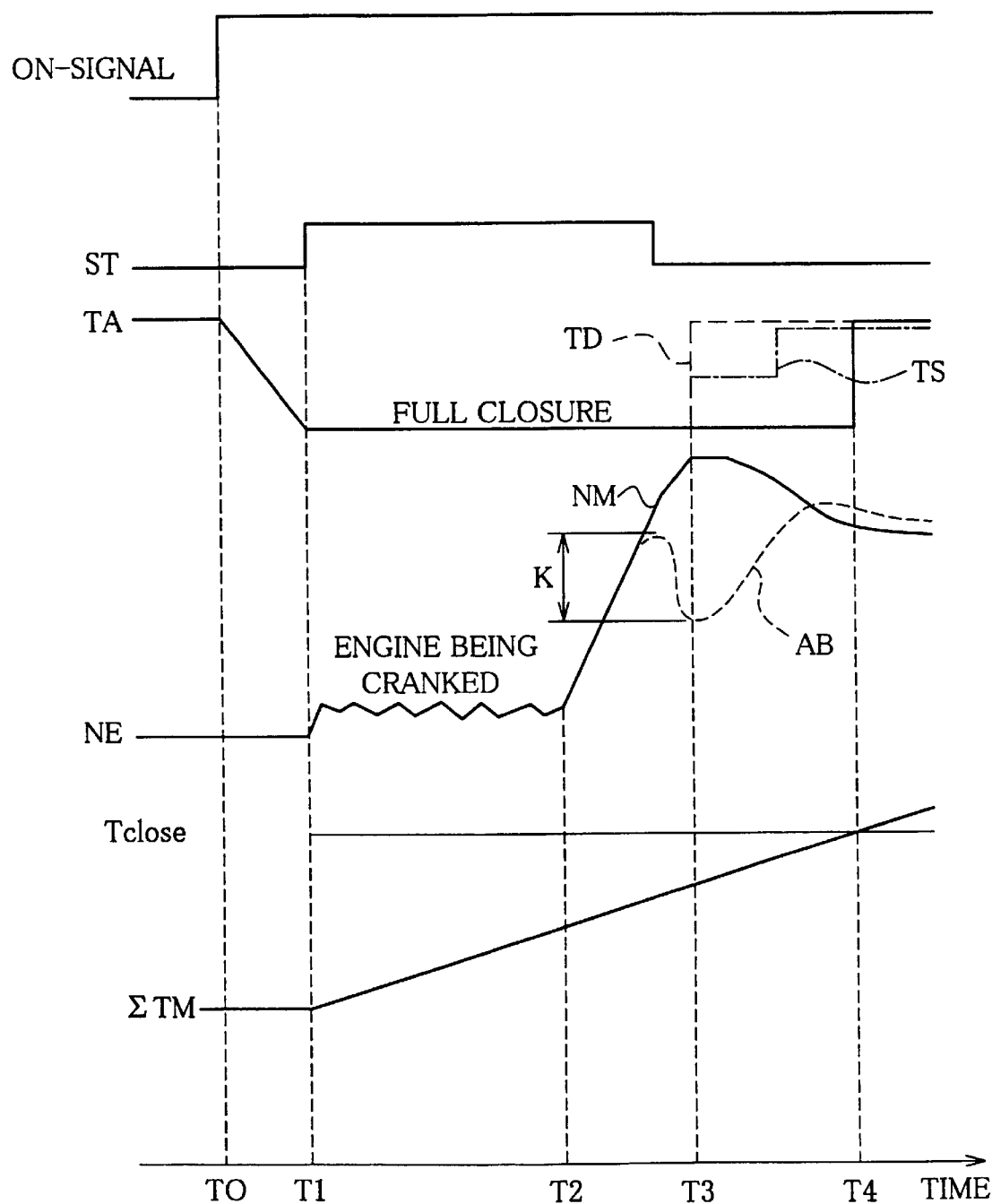
FIG. 9 is a time chart showing how the ON-position signal of the ignition switch, the starter position signal, the starter signal to the starter, the throttle opening degree, the engine rotational speed and an elapsed time after start of the engine change with the lapse of time.

FIG. 9 is a time chart showing how the ON-position signal of the ignition switch 17, the starter signal STR from the ECU 10, the throttle opening degree TA as an opening degree of the throttle valve 3, the engine rotational speed NE and the elapsed time after the engine starting operation change with the lapse of time, in the control procedure in the third and fourth embodiments described with reference to FIGS. 6 and 7.

First of all, the control procedure of the third embodiment will be described using the time chart.

The same processings as in FIG. 5 will not be explained.

In the control of the third embodiment, if the starter 19 rotates and the engine 1 enters its cranking state, the operation proceeds from step S103 to step S301 where a holding time Tclose for holding the throttle valve 3 completely closed is calculated.

After the time T2, the elapsed time continues to be calculated constantly, and Tclose becomes equal to ΣTM at the time T4. Thus, through the control in step S108, the throttle valve 3 is opened from its engine-starting full-closure position, and the throttle opening degree TA increases to a predetermined opening degree, for example, an idle opening degree.

In order to explain the case of the fourth embodiment, it is assumed that the rotational speed of the engine 1 started at the time T2 drops as indicated by a broken line AB and that the drop rate ΔNEdown of the engine rotational speed has become equal to or higher than the criterion value K at the time T3. In this case, according to the fourth embodiment, the throttle valve 3 is opened through the control in step S402, and the throttle opening degree TA increases to a predetermined opening degree as indicated by the broken line TD. The throttle valve 3 may be opened to the predetermined opening degree at a breath at the time T3 or may be opened gradually as indicated by the alternate long and short dash line TS.

As described hitherto, according to the third embodiment, the holding time Tclose for holding the throttle valve 3 completely closed is calculated according to the type of the engine 1 and environmental conditions. If the elapsed time ΣTM after the starting of the engine 1 becomes equal to or longer than the holding time Tclose, the throttle valve 3 is opened. Therefore, the throttle valve 3 can be held completely closed within such a range that the engine does not fail to be started due to a deficiency in amount of intake air in the engine. Consequently, both reduction of concentrations of emission substances and improvement in startability can be achieved.

In the control of the fourth embodiment, even in the case where the elapsed time ΣTM after the starting of the engine 1 has not reached the holding time Tclose for holding the throttle valve completely closed, if the rotational speed of the engine 1 has dropped abruptly, the throttle valve 3 is opened so as to prevent the engine 1 from failing to be started. Therefore, even in the case where considerable friction has arisen in the engine, the engine is prevented from going into a stall or failing to be started.

Figure 10:
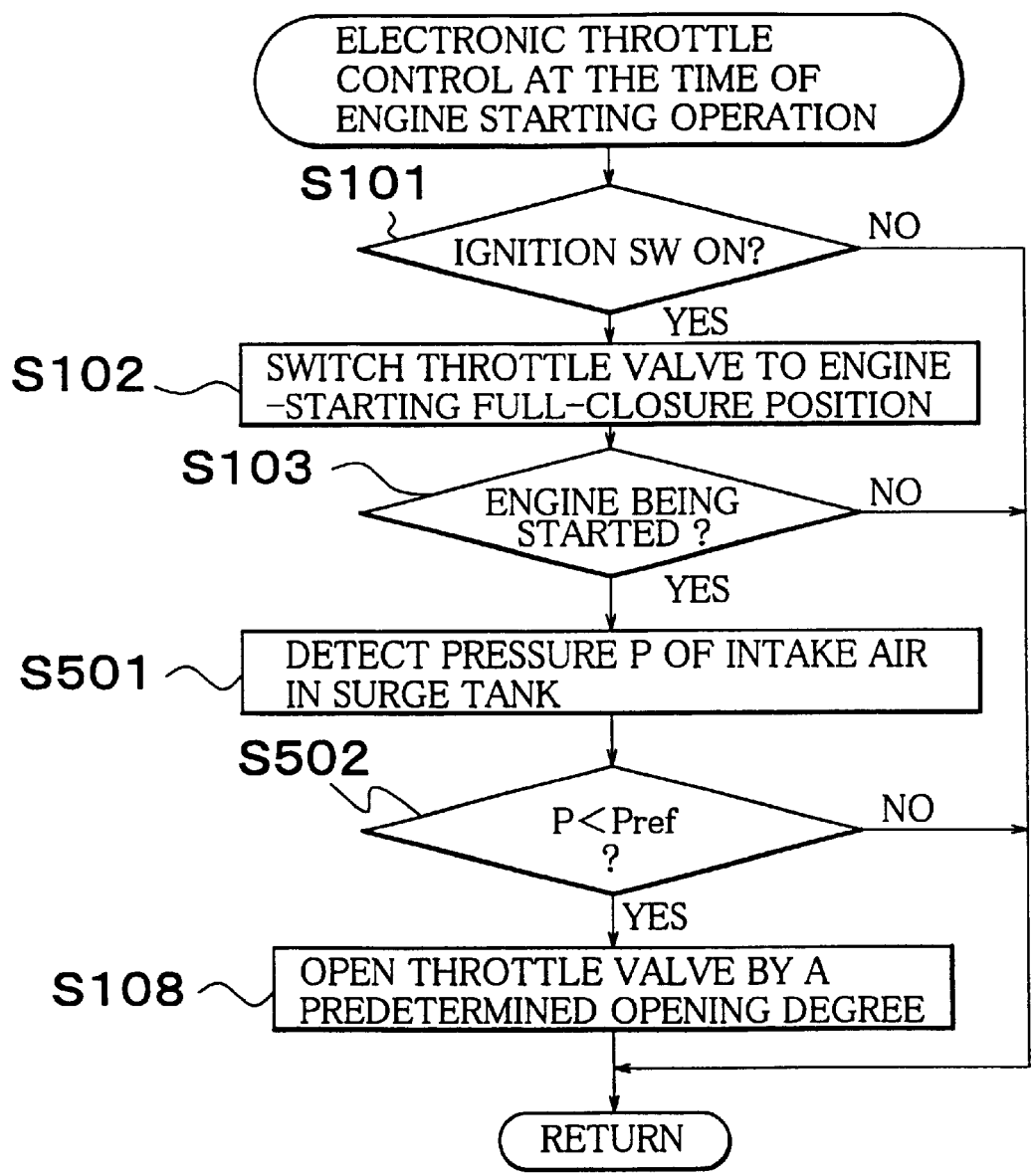
FIG. 10 is a flowchart showing how to control the electronically controlled throttle valve at the time of engine starting operation.

FIG. 10 is a flowchart showing a fifth embodiment of a control procedure for opening the throttle valve 3 that has been completely closed since the starting of the engine 1. The routine shown in this flowchart is also carried out at intervals of a predetermined length of time, for example, several milliseconds. In the control of the fifth embodiment, when the pressure of intake air in the engine 1 downstream of the throttle valve 3 becomes lower than a predetermined value, the throttle valve 3 is opened.

In the fifth embodiment, if the result in step S103 is YES (if the starter 19 is in operation), the operation proceeds to step S501.

In step S501, the pressure sensor 7 detects an intake air pressure P in the surge tank 6 of the engine 1. In the following step S502, the intake air pressure P in the surge tank is compared with a reference pressure Pref. If P≧Pref, the routine is terminated without performing any other processings. If P<Pref, the operation proceeds to step S108, where the throttle valve 3 is opened from its engine-starting full-closure position to a predetermined opening degree. The routine is then terminated.

Figure 11:
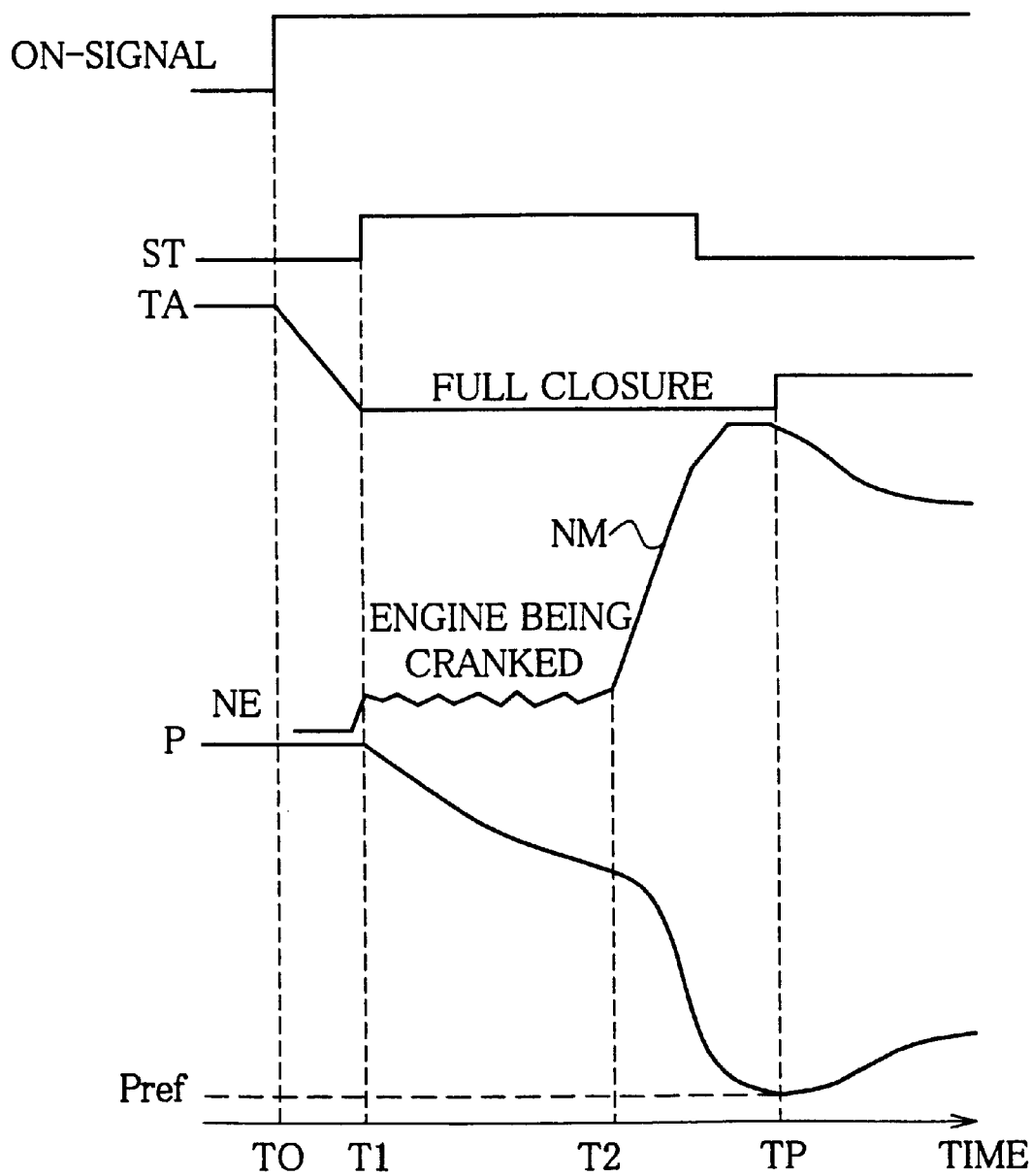
FIG. 11 is a time chart showing how the ON-position signal of the ignition switch, the starter position signal, the starter signal to the starter, the throttle opening degree, the engine rotational speed and a pressure in an intake pipe change with the lapse of time.

FIG. 11 is a time chart showing how the ON-position signal of the ignition switch 17, the starter signal ST from the ECU 10, the throttle opening degree TA as an opening degree of the throttle valve 3, the engine rotational speed NE and the intake pipe pressure P change with the lapse of time, in the control procedure in the fifth embodiment.

The same procedure as in FIGS. 5 and 9 will not be described.

In the control of the fifth embodiment, after the starter 19 has rotated and the engine 1 has entered its cranking state, the operation proceeds to step S501 where an intake pipe pressure P in the surge tank 6 is detected.

After the time T2, the intake pipe pressure P continues to be detected constantly. In the fifth embodiment, P becomes equal to Pref at a time TP which is later than the time T2. Thus, the throttle valve 3 is opened through the control in step S108, and the throttle opening degree TA slightly increases.

As described hitherto, according to the fifth embodiment, the intake air pressure P in the surge tank 6 after the starting of the engine 1 is detected. If the intake air pressure P has decreased to the reference value Pref, the throttle valve 3 that has been completely closed since the engine starting operation is opened.

Accordingly, the throttle valve 3 can be held completely closed within such a range that the engine does not fail to be started due to a deficiency in amount of intake air in the engine. Consequently, both reduction of concentrations of emission substances and improvement in startability can be achieved.

The control according to the aforementioned embodiment makes it possible to open the throttle valve at an appropriate timing when starting the engine. Therefore, it is possible to increase an amount of intake air in the engine while maintaining stabilized combustion.

While the throttle valve is opened in the aforementioned embodiment, a fuel injection amount that follows a change in actual negative pressure in the intake pipe or in amount of intake air is calculated, and fuel is supplied to the engine. Thereby the startability of the engine can further be improved.

Figure 12:
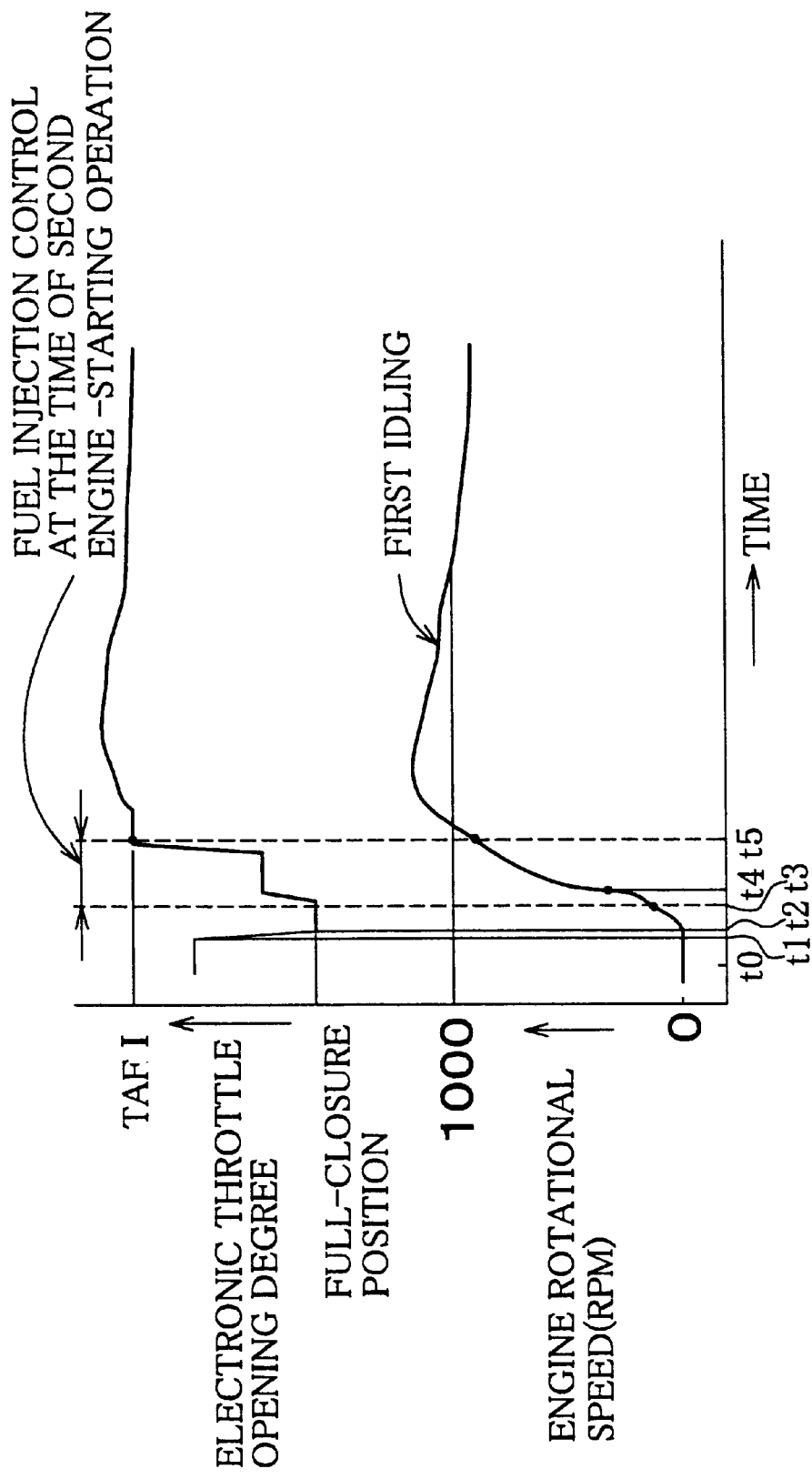
FIG. 12 shows how the engine rotational speed and the opening degree of the throttle valve change at the time of engine starting operation.

FIG. 12 shows how the engine rotational speed and the opening degree of the throttle valve change when starting the engine. The axis of ordinate represents time, the upper part of the axis of abscissa represents throttle opening degree, and the lower part of the axis of abscissa represents rotational speed of the engine. If the ignition switch 17 is turned on (at the time t0) and then switched to the starter position (at the time t1), the throttle valve 3 starts to be closed. Then, the starter 19 is activated as soon as the throttle valve is closed to its full-closure position (at the time t2), and the engine is started. When all the air that exists in the intake passage 2 downstream of the throttle valve 3 at the time t2 is sucked into the cylinders of the engine 1 (at the time t3), the throttle valve 3 is opened again. After that, when the engine 1 reaches a state of complete explosion, namely, when the engine 1 reaches a rotational speed (e.g. 400 RPM) enabling operation without assistance from the starter 19 (at the time t4), the starter 19 is stopped from being driven. Then, when the throttle valve 3 reaches an opening degree TAFI suited to supply an amount of air corresponding to a first idle rotational speed, for example, 1000 RPM (at the time t5), the throttle valve 3 is stopped from being opened.

The fuel injection amount is proportional to an open period of the fuel injection valve 8, namely, to a fuel injection time. Therefore, the fuel injection amount is calculated through calculation of a fuel injection time. The fuel injection time is calculated according to a first engine-starting fuel injection time calculating routine from the time t2 to the time t3. From the time t3 to the time t5 indicated by a broken line, the fuel injection time is calculated according to a second engine-starting fuel injection time calculating routine, based on a load factor of the engine 1 that has been calculated in accordance with a rotational speed of the engine 1 and an opening degree of the throttle valve 3. After the time t5, the fuel injection time is calculated according to a post-engine-starting fuel injection time calculating routine, based on a load factor of the engine 1 that has been calculated in accordance with a rotational speed of the engine 1 and an intake pressure.

Figure 13:
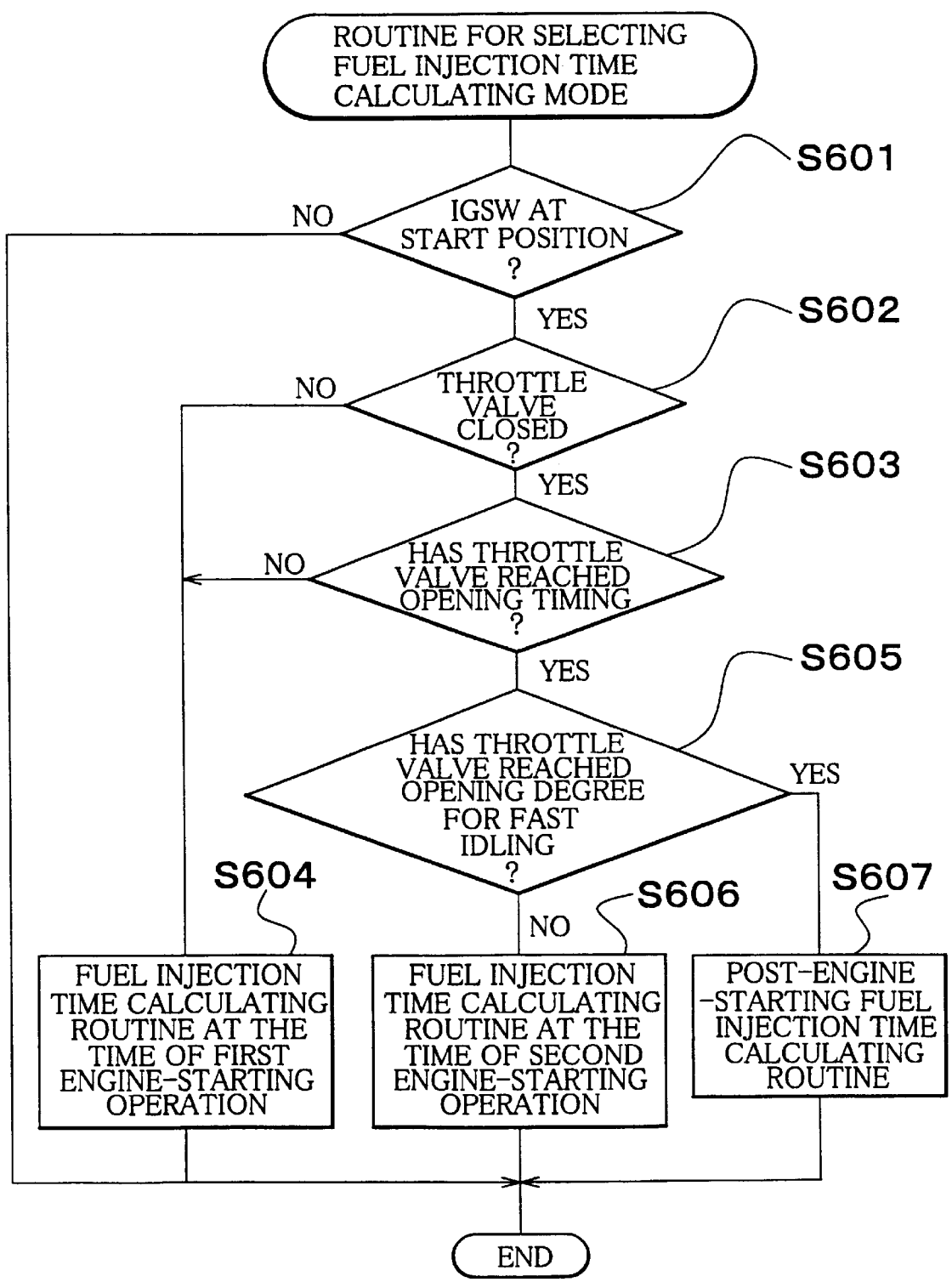
FIG. 13 is a flowchart of a routine for selecting a fuel injection time calculating mode.

FIG. 13 is a flowchart of a routine for selecting modes for calculating fuel injection amount and time. This routine, which belongs to a main routine, is carried out at intervals of a predetermined length of time, for example, 1 milliseconds. First of all, it is determined in step S601 whether or not the ignition switch (IGSW) 17 is at the starter position. If the IGSW 17 is at the starter position, the operation proceeds to step S601. If the IGSW 17 is not at the starter position, the routine is terminated. It is determined in step S602 whether or not the throttle valve 3 has reached its full-closure position, namely, whether or not the intake passage 2 has been closed. If the result is YES in step S602, the operation proceeds to step S603. If the result is NO in step S602, the operation proceeds to step S604.

It is determined in step S603 whether or not a timing for starting to open the throttle valve 3 has been reached. If the result in step S603 is YES, the operation proceeds to step S605. If the result in step S603 is NO, the operation proceeds to step S604. The timing for starting to open the throttle valve 3 corresponds to the time t3 when all the air (hereinafter referred to as residual air) that exists in the intake passage 2 downstream of the throttle valve 3 at the time t2 shown in FIG. 12 is sucked into the cylinders of the engine 1. The amount of residual air can be calculated from a design drawing of the intake passage 2. Alternatively, the amount of residual air can be calculated by measuring a volume of water poured into the intake passage 2 downstream of the throttle valve 3 with all the intake valves of the engine 1 being closed.

The number of revolutions of the engine 1 required to suck all the amount of residual air thus calculated can be calculated from a cylinder volume per revolution of the engine 1 and a volumetric efficiency of the intake system. For example, when the cylinder volume of the engine 1 is 1600 cc, exhaust gas of 800 cc is discharged per revolution of the engine 1.

A map for calculating an amount of intake air per unit time from a rotational speed of the engine 1 may be prepared in advance. In this case, it is possible to calculate a timing when the amount of intake air reaches the amount of residual air, from a change in rotational speed after the starting of the engine.

A routine for calculating a first engine-starting fuel injection time TAUSTa is carried out in step S604. It is determined in step S605 whether or not the opening degree of the throttle valve 3 has reached an opening degree TAFI for supplying an amount of air corresponding to a first idle rotational speed. If TA<TAFI, the operation proceeds to step S606. If TA≦TAFI, the operation proceeds to step S607. In step S606, a routine for calculating a second engine-starting fuel injection time TAUSTb is carried out. In step S607, a routine for calculating a post-engine-starting fuel injection time TAU is carried out.

The routines for calculating a fuel injection time in the respective modes will be described hereinafter.

Figure 14:
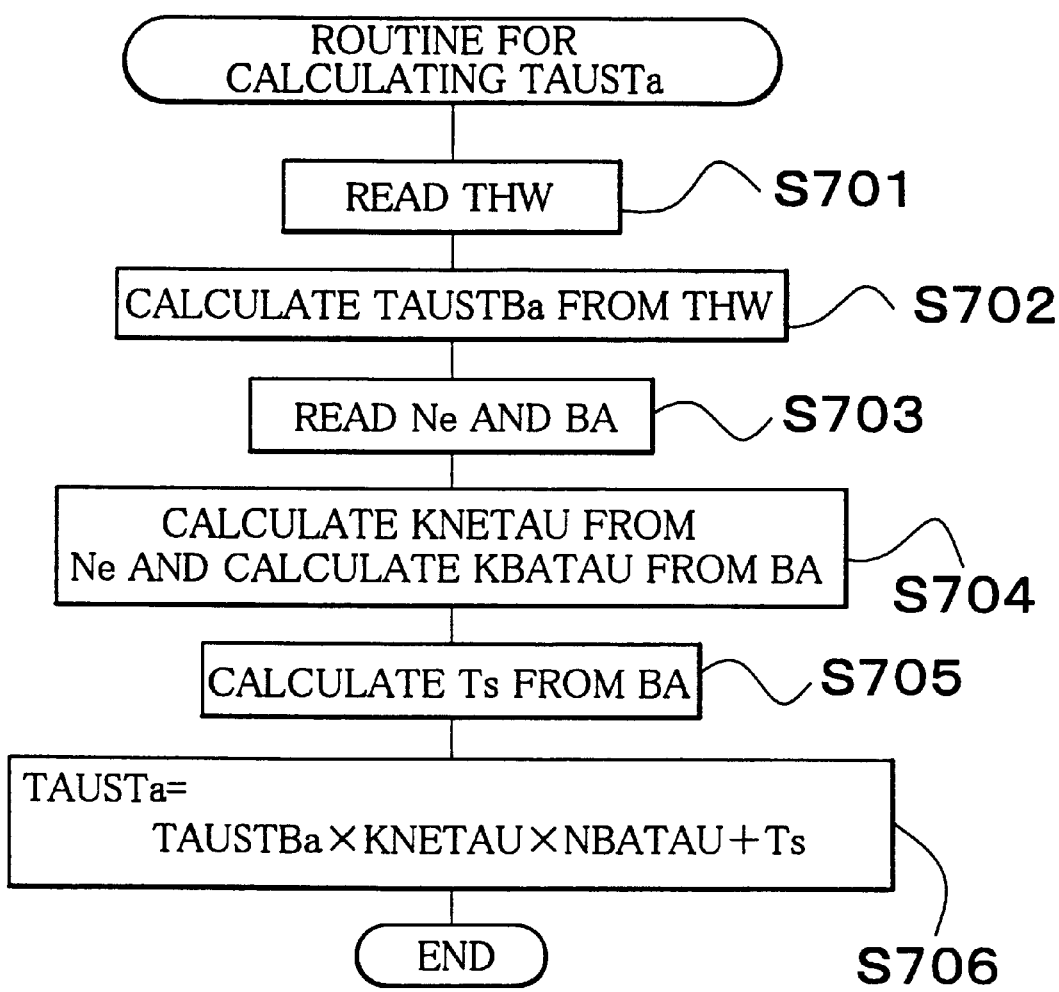
FIG. 14 is a flowchart of a routine for calculating a first engine-starting fuel injection time.

FIG. 14 is a flowchart of the routine for calculating the first engine-starting fuel injection time TAUSTa. This processing routine is carried out in the main routine. In step S701, a coolant temperature THW of the engine 1 is read from the coolant temperature sensor 11 disposed in a water jacket of an engine block. In step S702, a first base fuel injection time TAUSTBa is calculated from a map stored in the ROM based on the read coolant temperature THW. In step S703, an engine rotational speed Ne is read from the rotational speed sensor 21, and a battery voltage BA is read through an A/D converter (not shown). In step S704, correction factors KNETAU and NBATAU are calculated from the maps stored in the ROM, based on the rotational speed Ne and the battery voltage BA that have been read. In step S705, an invalid injection time Ts is calculated from the map stored in the ROM, based on the read battery voltage BA. The invalid injection time represents an operational delay time from the driving of the fuel injection valve 8 to the actual opening thereof, namely, a time when no fuel is injected despite issuance of a command to open the fuel injection valve 8. In step S706, a first engine-starting fuel injection time TAUSTa (milliseconds) is calculated according to a formula (2) shown below, using the base fuel injection time TAUSTBa, the correction factors KNETAU and NBATAU, and the invalid injection time Ts.

$$TAUSTa = TAUSTBa \times KNETAU \times NBATAU + Ts \quad (2)$$

Figure 15:
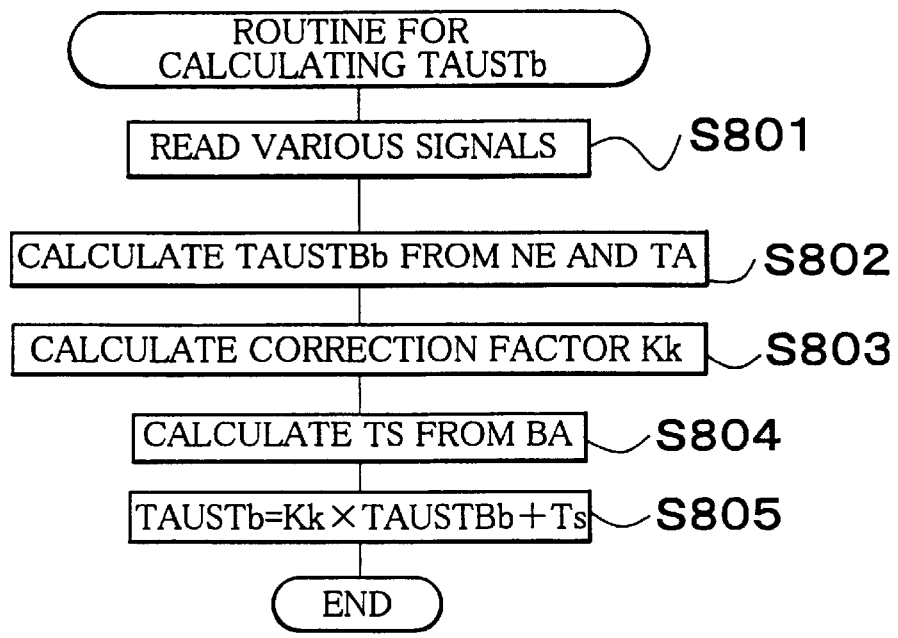
FIG. 15 is a flowchart of a routine for calculating a second engine-starting fuel injection time.

FIG. 15 is a flowchart of a routine for calculating the second engine-starting fuel injection time TAUSTb. This processing routine is carried out in the main routine. In step S801, various signal input data are read. In step S802, a base fuel injection time TAUSTBb at the time of the second engine starting operation corresponding to an operational state of the engine 1 is calculated from a two-dimensional map (not shown) stored in the ROM, based on data concerning the rotational speed of the engine 1 and the throttle opening degree TA that have been read. The throttle opening degree TA is used as a parameter indicative of a loaded condition of the engine 1.

In step S803, a correction factor Kk determined by the coolant temperature THW, the intake air temperature THA and the like is calculated. Then in step S804, an invalid injection time Ts is calculated from the map stored in the ROM, based on the battery voltage BA. In step S805, a post-engine-starting fuel injection time TAUSTb (milliseconds) is calculated from a following formula (3) shown below, using the second base fuel injection time TAUSTb, the correction factor Kk and the invalid injection time Ts calculated in steps S802, S803 and S804.

$$TAUSTb = Kk \times TAUSTBb + Ts \quad (3)$$

Figure 16:
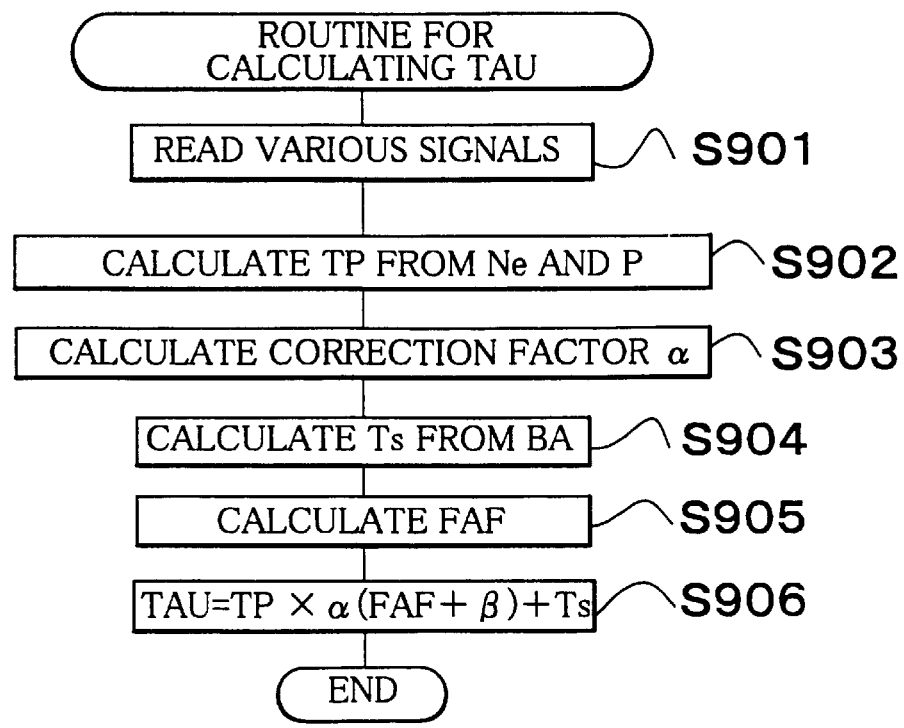
FIG. 16 is a flowchart of a routine for calculating a post-engine-starting fuel injection time.

FIG. 16 is a flowchart of a routine for calculating a post-engine-starting fuel injection time TAU. This processing routine is carried out in the main routine. In step S901, various signal input data are read. In step S902, a base fuel injection time TP corresponding to an operational state of the engine 1 is calculated from a two-dimensional map stored in the ROM, based on data concerning the rotational speed Ne of the engine 1 and the intake air pressure P that have been read. In step S903, a correction factor α, which is determined by the coolant temperature THW, the throttle opening degree TA, the intake air temperature THA and the like, is calculated. Then in step S904, an invalid injection time Ts is calculated from a map stored in the ROM based on the battery voltage BA. Then in step S905, an air-fuel ratio correction factor FAF is calculated based on a difference between the air-fuel ratio of the engine 1 determined from an output of the O$_2$ sensor 13 and a map (not shown), and a target air-fuel ratio (e.g. a stoichiometric air-fuel ratio). The air-fuel ratio correction factor FAF is a feedback correction factor for performing control such that the air-fuel ratio of the engine 1 becomes equal to a stoichiometric air-fuel ratio, in accordance with an output value of an air-fuel ratio sensor circuit (not shown) of the O$_2$ sensor 13. The air-fuel ratio correction factor FAF is equal to 1.0 when neither reducing correction nor increasing correction is made. The air-fuel ratio correction factor FAF is greater than 0.8 and smaller than 1.0 when reducing correction is made. The air-fuel ratio correction factor FAF is greater than 1.0 and smaller than 1.2 when increasing correction is made. In step S906, a post-engine-starting fuel injection time TAU is calculated from a formula (4) shown below, using the base fuel injection time TP, the correction factor α, the invalid injection time Ts and the air-fuel ratio correction factor FAF.

$$TAU = TP \times \alpha (FAF + \beta) + Ts \quad (4)$$

In the formula (4), β represents a correction factor that is different from FAF.

The fuel injection valve 8 corresponding to each cylinder of the engine 1 is opened for a fuel injection time that has been calculated in the aforementioned respective routines for calculating fuel injection amount and time. As a result, a suitable amount of fuel and a suitable amount of air are supplied to each of the cylinders.

Further, in the aforementioned embodiment, the opening degree of the throttle valve is adjusted according to a depression amount of the accelerator pedal when starting the engine, and an amount of air required to prevent the plug from smoldering or to eliminate other inconveniences is supplied to the engine. The startability of the engine can thereby be improved.

Figure 17:
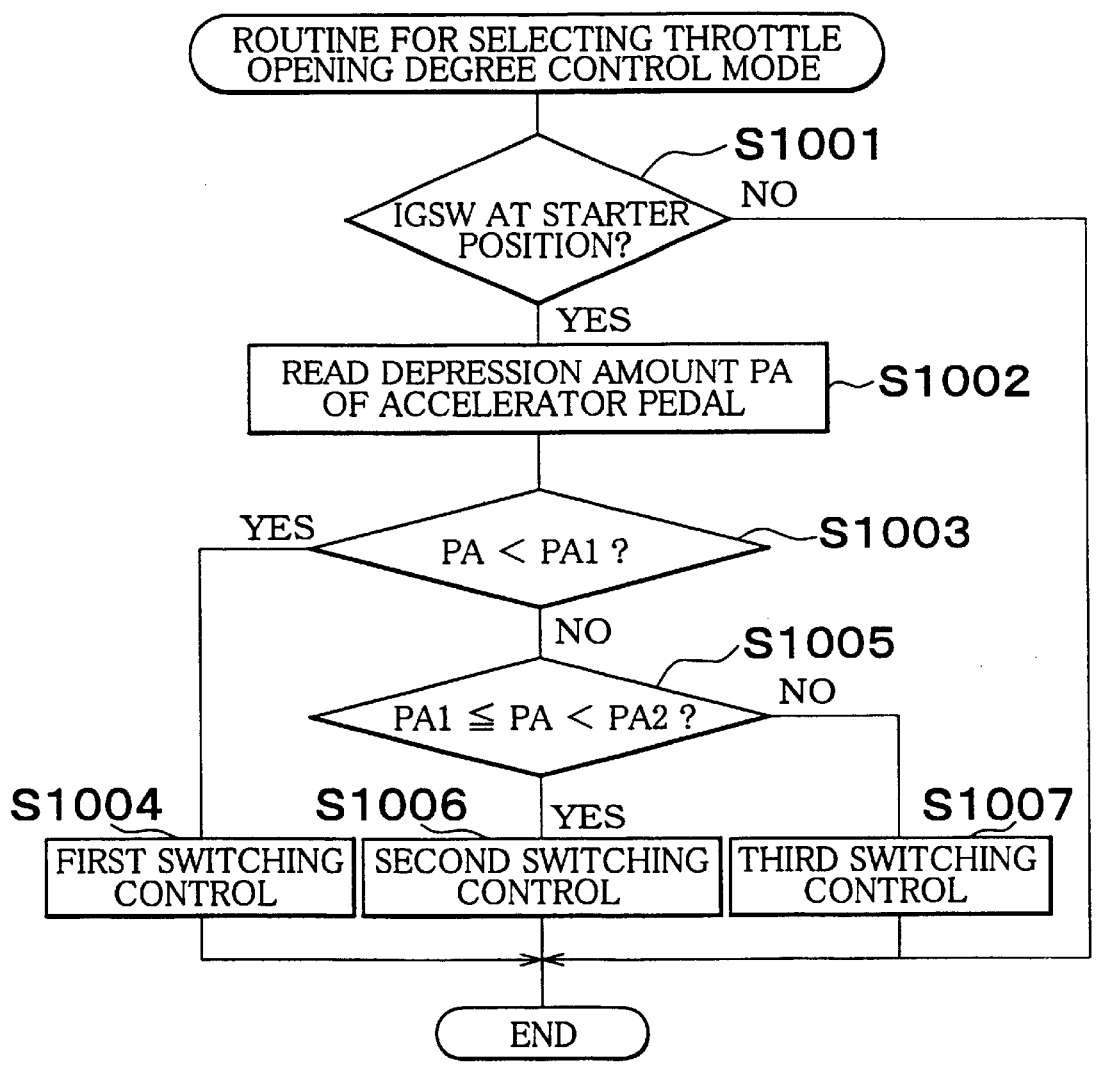
FIG. 17 is a flowchart of a routine for selecting a switching control mode of the opening degree of the throttle valve.

FIG. 17 is a flowchart of a routine for selecting a switching control mode of the opening degree of the throttle valve. The routine shown in this flowchart is carried out at intervals of a predetermined length of time, for example, 100 milliseconds. First of all, it is determined in step S1001 whether or not the ignition switch (IGSW) 17 is at the starter position. If the IGSW 17 is at the starter position, the operation proceeds to step S1002. If the IGSW 17 is not at the starter position, the routine is terminated. In step S1002, a depression amount PA of the accelerator pedal 14 depressed by the driver is read.

It is determined in step S1003 whether or not the depression amount PA is smaller than a first depression amount PA1. If PA<PA1, the operation proceeds to step S1004 where later-described first switching control of the throttle valve 3 is performed. If PA≧PA1, the operation proceeds to step S1005.

It is determined in step S1005 whether or not the depression amount PA read in step S1002 is equal to or greater than the first depression amount PA1 and smaller than a second depression amount PA2. If PA1≦PA≦PA2, the operation proceeds to step S1006. If PA≧PA2, the operation proceeds to step S1007. In step S1006, later-described second switching control of the throttle valve 3 is performed. In step S1007, later-described third switching control of the throttle valve 3 is performed.

Next, switching control of the throttle valve in the respective modes will be described.

The first switching control of the opening degree of the throttle valve is performed based on FIG. 12 as described above.

That is, if the depression amount PA of the accelerator pedal 14 detected by the accelerator opening degree sensor 15 is smaller than the first depression amount PA1, the throttle valve 3 is closed to its full-closure position after the engine starting operation, and control is performed such that the throttle valve 3 is gradually opened from a time when air in the intake passage 2 downstream of the throttle valve 3 is admitted into the cylinders to a time when the engine 1 reaches a predetermined rotational speed, namely, a first idle rotational speed. The first switching control is designed to prevent a great amount of intake air from flowing into the engine 1 by closing the intake passage 2 when starting the engine 1 and to promote gasification of fuel by increasing a negative pressure in the intake pipe. Accordingly, fuel injected from the fuel injection valve 8 is sufficiently atomized and the startability of the engine is improved.

Figure 18:
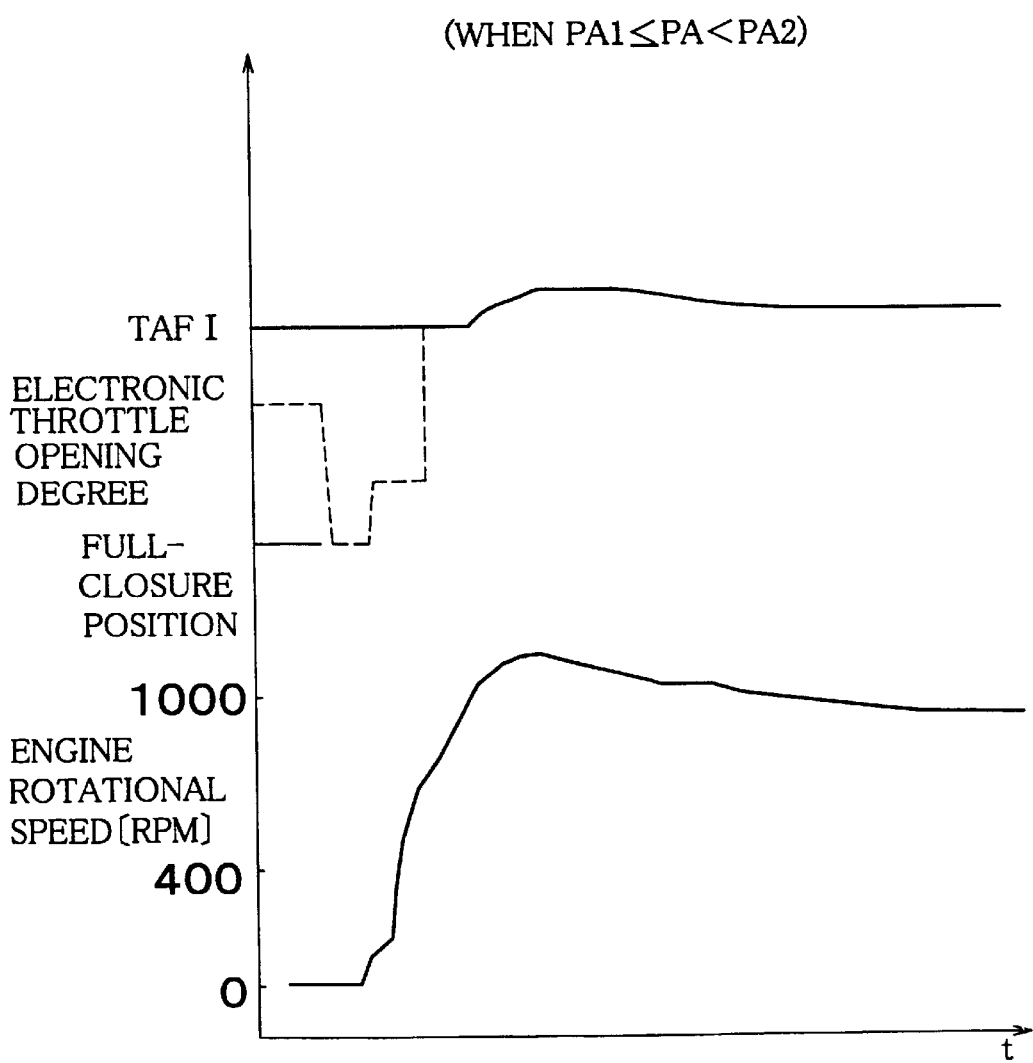
FIG. 18 is an explanatory view of second switching control of the opening degree of the throttle valve.

The second switching control of the opening degree of the throttle valve will be described with reference to FIG. 18. Referring to FIG. 18, the opening degree of the throttle valve 3 set by the first switching control is indicated by a broken line. The second switching control of the opening degree of the throttle valve 3 is designed to open the throttle valve 3 to an opening degree TAFI corresponding to an amount of air required for fast idling when the depression amount PA of the accelerator pedal 14 is equal to or greater than the first depression amount PA1 and smaller than the second depression amount PA2.

According to the second switching control, when the driver intends to supply the engine 1 with an amount of air required to prevent the plug from smoldering or to eliminate other inconveniences, the throttle valve 3 is opened to an opening degree corresponding to an amount of air required for fast idling by depressing the accelerator pedal 14 to a certain extent. Thereby the driver's intention can be reflected, so that the startability of the engine 1 is improved.

Figure 19:
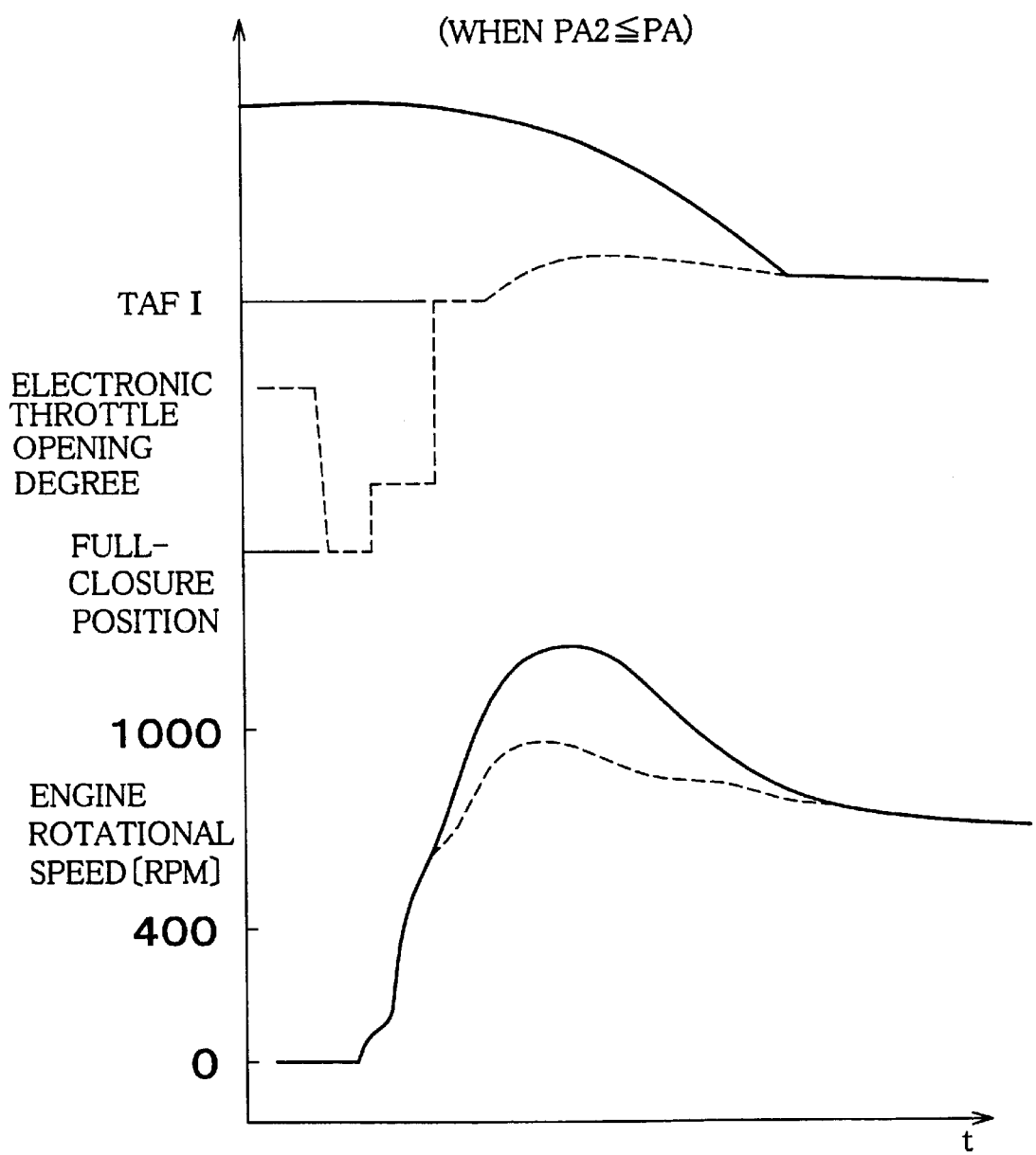
FIG. 19 is an explanatory view of third switching control of the opening degree of the throttle valve.

The third switching control of the opening degree of the throttle valve will be described with reference to FIG. 19. Referring to FIG. 19, the opening degree of the throttle valve 3 set by the first switching control and the rotational speed of the engine 1 are indicated by broken lines. The third switching control of the opening degree of the throttle valve 3 is designed to open the throttle valve 3 according to the depression amount PA of the accelerator pedal when the depression amount PA of the accelerator pedal 14 is equal to or greater than the second depression amount PA2.

According to the third switching control, when the driver intends to supply the engine 1 with an amount of air required to prevent the plug from smoldering or to eliminate other inconveniences, the throttle valve 3 is opened to an opening degree corresponding to the depression amount PA of the accelerator pedal by greatly depressing the accelerator pedal 14. Thereby the driver's intention can be reflected, so that the startability of the engine 1 is improved.

Further, in the aforementioned respective embodiments, in order to inhibit an amount of intake air from changing considerably at the time of a transition from closing control to opening control of the throttle valve, driving control of the throttle valve 3 and the fuel injection control may be performed. The driving control of the throttle valve 3 and the fuel injection control will be described hereinafter.

Figure 20:
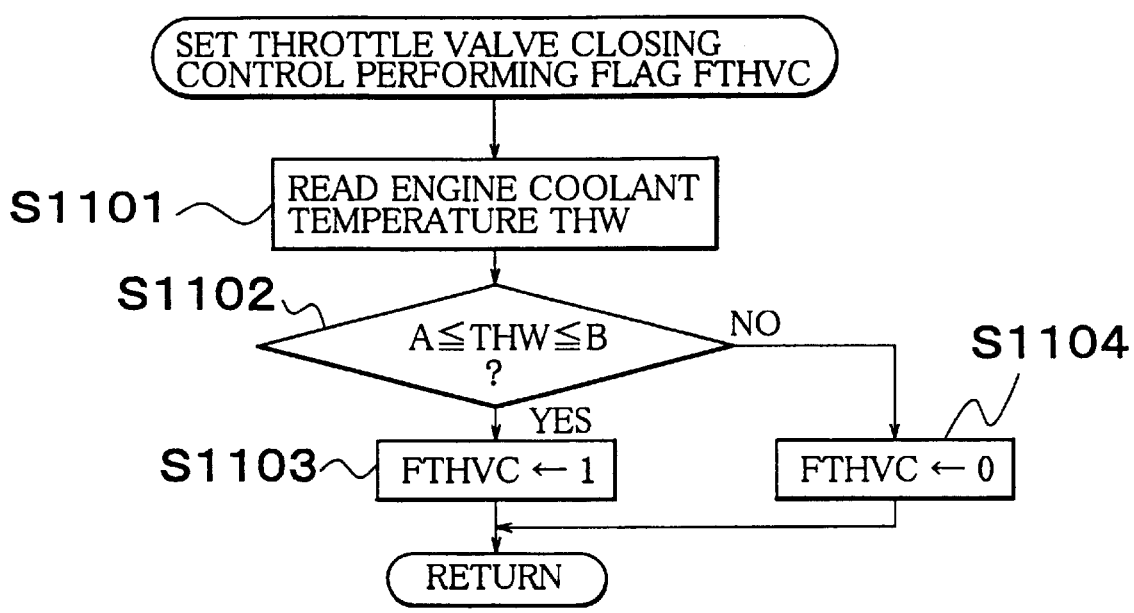
FIG. 20 is a flowchart showing how to set a flag for performing closing control of the throttle valve.

In the driving control of the throttle valve 3, first of all, in step S1101 shown in FIG. 20, an engine coolant temperature THW detected by the coolant temperature sensor 11 is read. It is determined in step S1102 whether or not the coolant temperature is within a predetermined temperature range A to B °C. If the coolant temperature THW is outside the range, the operation proceeds to step S1104 where a throttle valve closing control performing flag FTHVC is set to "0". The routine is then terminated. On the other hand, if the coolant temperature THW is within the range, the operation proceeds to step S1103 where the throttle valve closing control performing flag FTHVC is set to "1". The routine is then terminated. When the throttle valve closing control performing flag FTHVC is set to "1", the throttle valve closing control is performed.

Figure 21:
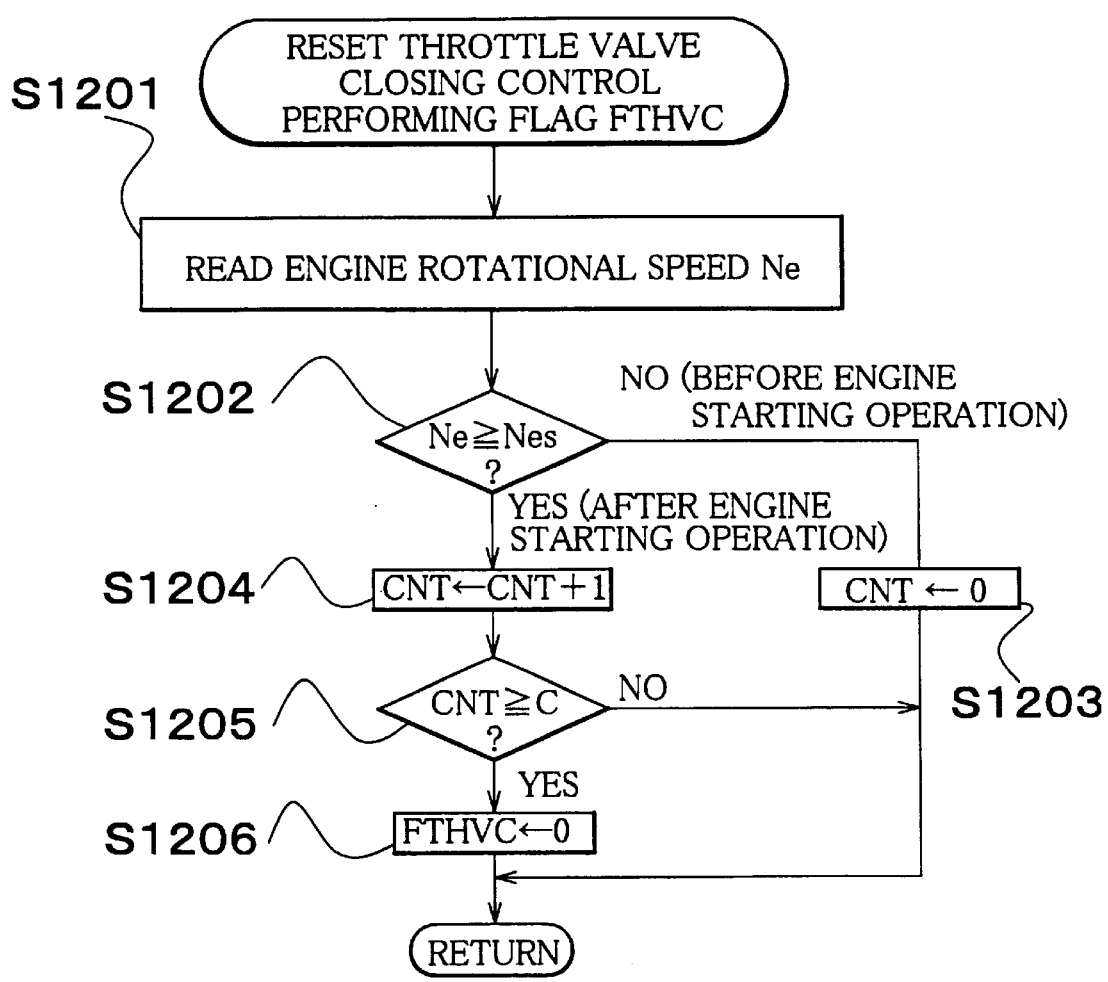
FIG. 21 is a flowchart showing how to reset a flag for performing opening control of the throttle valve.

The throttle valve closing control performing flag FTHVC, which is set to "1" when the coolant temperature THW is within the range of A≦THW≦B in starting the engine 1, is reset after the lapse of a predetermined length of time from the starting of the engine 1. The time for resetting the throttle valve closing control performing flag FTHVC can be set, for example, by taking into account a time required for an amount of air downstream of the throttle valve upon opening of the throttle valve to reach null after the engine starting operation. This control will be described with reference to the flowchart shown in FIG. 21. The routine shown in FIG. 21 is also carried out at intervals of a predetermined length of time, for example, several milliseconds, in the initial routine only when the engine 1 is started.

In this control, first of all, an engine rotational speed Ne is read in step S1201. It is determined in the following step S1202 whether or not the engine rotational speed Ne is equal to or higher than a set rotational speed Nes (e.g. 400 rpm). If the engine rotational speed Ne is lower than the set rotational speed Nes, it is determined that the engine has not been started yet, and the operation proceeds to step S1203 where a post-engine-starting elapsed time counter CNT is cleared. The routine is then terminated.

If the rotational speed Ne is equal to or higher than the set rotational speed Nes in step S1202, it is determined that the engine has been started, and the operation proceeds to step S1204. In step S1204, the value of the post-engine-starting elapsed time counter CNT is incremented by 1. In the following step S1205, it is determined whether or not the value of the post-engine-starting elapsed time counter CNT has reached a reference counting value C indicative of a predetermined length of time. If the value of the post-engine-starting elapsed time counter CNT has not reached the reference counting value C, the operation proceeds to step S1206 where the throttle valve closing control performing flag FTHVC is set to "0". The routine is then terminated. In this manner, the throttle valve closing control performing flag FTHVC, which has been set to "1" at the time of engine starting operation, is set to "0" after the lapse of a predetermined length of time from the starting of the engine.

Figure 22:
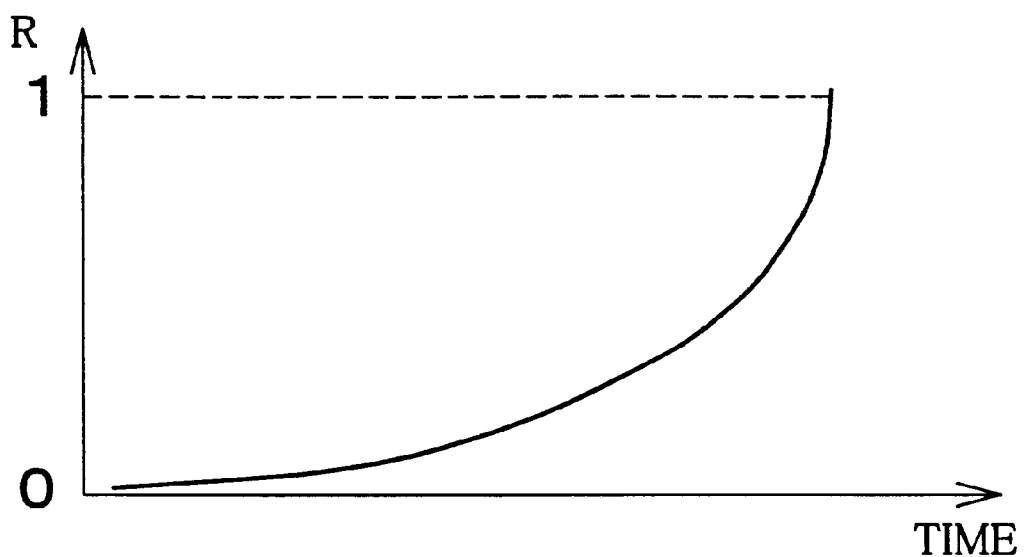
FIG. 22 is a characteristic diagram showing how a ratio of air consumed by the intake system changes with the lapse of time.

FIG. 22 is a characteristic diagram showing an air consumption ratio R in the intake system in the case where the air existing in the volume Vvol in the intake passage 2 downstream of the throttle valve 3 decreases with the lapse of time when the engine 1 is cranked and started after the throttle valve 3 has been completely opened. The air consumption ratio R is a value obtained by dividing a cumulative amount ΣU of air consumed by the internal combustion engine 1 by an amount Vvol of air in the intake system. When the cumulative air consumption amount ΣU is small, the air consumption ratio R is close to zero. As the cumulative air consumption amount ΣU increases, the air consumption ratio R increases and approaches 1. That is, the air consumption ratio R is in the range of 0≦R≦1. Because the air consumption ratio R in the intake system is hereinafter used as a coefficient, it will be referred to as a transitional coefficient.

In an internal combustion engine that is not equipped with an electronic throttle, if the driver has switched the ignition switch 17 to the starter position and depressed the accelerator pedal when starting the engine 1, the engine rotational speed rises in accordance with a depression amount of the accelerator pedal. On the other hand, in an internal combustion engine that is equipped with an electronic throttle as in the present invention, the rotational speed of the internal combustion engine can be controlled regardless of a depression amount of the accelerator pedal operated by the driver when starting the engine 1.

As a result, according to the present invention, when the engine 1 is cranked and started after the throttle valve 3 has been completely closed as shown in FIG. 22, the engine rotational speed is controlled so as to calculate a transitional coefficient R in advance. The transitional coefficient R thus calculated can be stored in the ROM 103 of the ECU 10.

In fact, the characteristic wherein the air existing in the volume Vvol downstream of the throttle valve 3 that has been opened since the starting of the engine decreases with the lapse of time can be calculated based on a rotational speed of the engine 1 (the rotational speed of the engine 1 is a known value because it is controlled on the side of the ECU 10) and a volumetric efficiency ηv used for calculation of an air consumption amount obtained from the map of the rotational speed of the engine 1. That is, the transitional coefficient R can be calculated from the cumulative air consumption amount ΣU.

Figure 23:
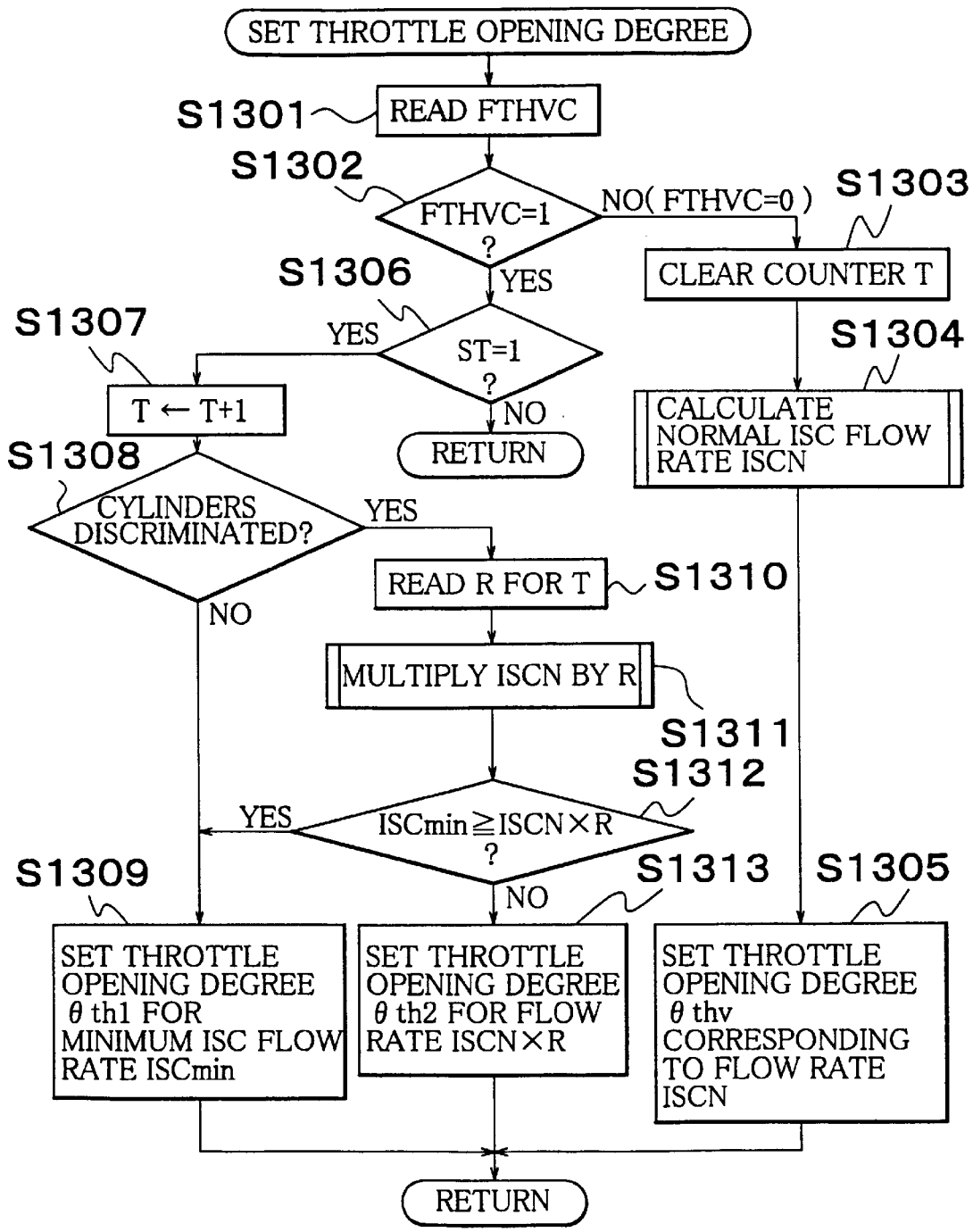
FIG. 23 is a flowchart showing how to set an opening degree of the electronically controlled throttle valve at the time of engine starting operation.

FIG. 23 is a flowchart showing a procedure of setting an opening degree of the electronically controlled throttle valve 3 when starting the engine 1. The routine shown in this flowchart is carried out at intervals of a predetermined length of time, for example, several milliseconds.

First of all, in step S1301, the value of the throttle valve closing control performing flag FTHVC is read. In the following step S1302, it is determined whether or not the throttle valve closing control performing flag FTHVC is set to "1". If the throttle valve closing control performing flag FTHVC is set to "0", it is determined that the engine 1 has already been started. The operation then proceeds to step S1303 where a time counter T is cleared. The operation then proceeds to step S1304. In step S1304, a normal ISC flow rate ISCN is calculated. In the following step S1305, a throttle valve opening degree θthv corresponding to the normal ISC flow rate ISCN is set as an opening degree of the throttle valve. The routine is then terminated.

If the throttle valve closing control performing flag FTHVC is set to "1" in step S1302, it is determined that the engine 1 is being started. The operation then proceeds to step S1306. It is determined in step S1306 whether or not the starter signal ST assumes a value of 1, namely, whether or not intake air is being sucked into the combustion chamber of the engine 1. If intake air is not being sucked into the combustion chamber, the routine is terminated. If intake air is being sucked into the combustion chamber, the operation proceeds to step S1307.

In step S1307, the value of the time counter T is incremented so as to calculate a cumulative time when the engine sucks intake air. In the following step S1308, it is determined whether or not discrimination of the cylinders has been finished after the cranking of the engine 1. If it is determined in step S1308 that discrimination of the cylinders has not been finished yet, the operation proceeds to step S1309. A throttle opening degree θth1 corresponding to a minimum ISC flow rate ISCmin is set as the opening degree of the throttle valve. The routine is then terminated.

If it is determined in step S1308 that discrimination of the cylinders has been finished, the operation proceeds to step S1310. In step S1310, a transitional coefficient (an air consumption ratio in the intake system) R corresponding to the value of the time counter T calculated in step S1307 is read from the ROM 103. In the following step S1311, a normal ISC flow rate ISCN is calculated as in step S1304. The normal flow rate ISCN is multiplied by the transitional coefficient R calculated in step S1310 so as to obtain a transitional air amount ISCN×R.

In step S1312, the minimum ISC flow rate ISCmin is compared with the transitional air amount ISCN×R calculated in step S1311. If ISCmin≧ISCN×R, the operation proceeds to step S1309 where an opening degree θth1 for a minimum ISC flow rate ISCmin is set as the opening degree of the throttle valve. If ISCmin<ISCN×R, the operation proceeds to step S1313 where a throttle opening degree θth2 for the transitional air amount R is set. The routine is then terminated.

The processing in step S1312 may be performed after the engine has rotated by predetermined revolutions following the cranking thereof, or after a predetermined length of time has elapsed following the cranking of the engine.

As shown in FIG. 22, after the cranking of the engine 1 has been started, the transitional coefficient R gradually increases in accordance with an increase in the counting value of the time counter T and approaches 1. Accordingly, the value of the throttle opening degree θth2 set in step S1313 gradually increases and finally reaches the normal ISC flow rate ISCN calculated in step S1305.

Figure 24:
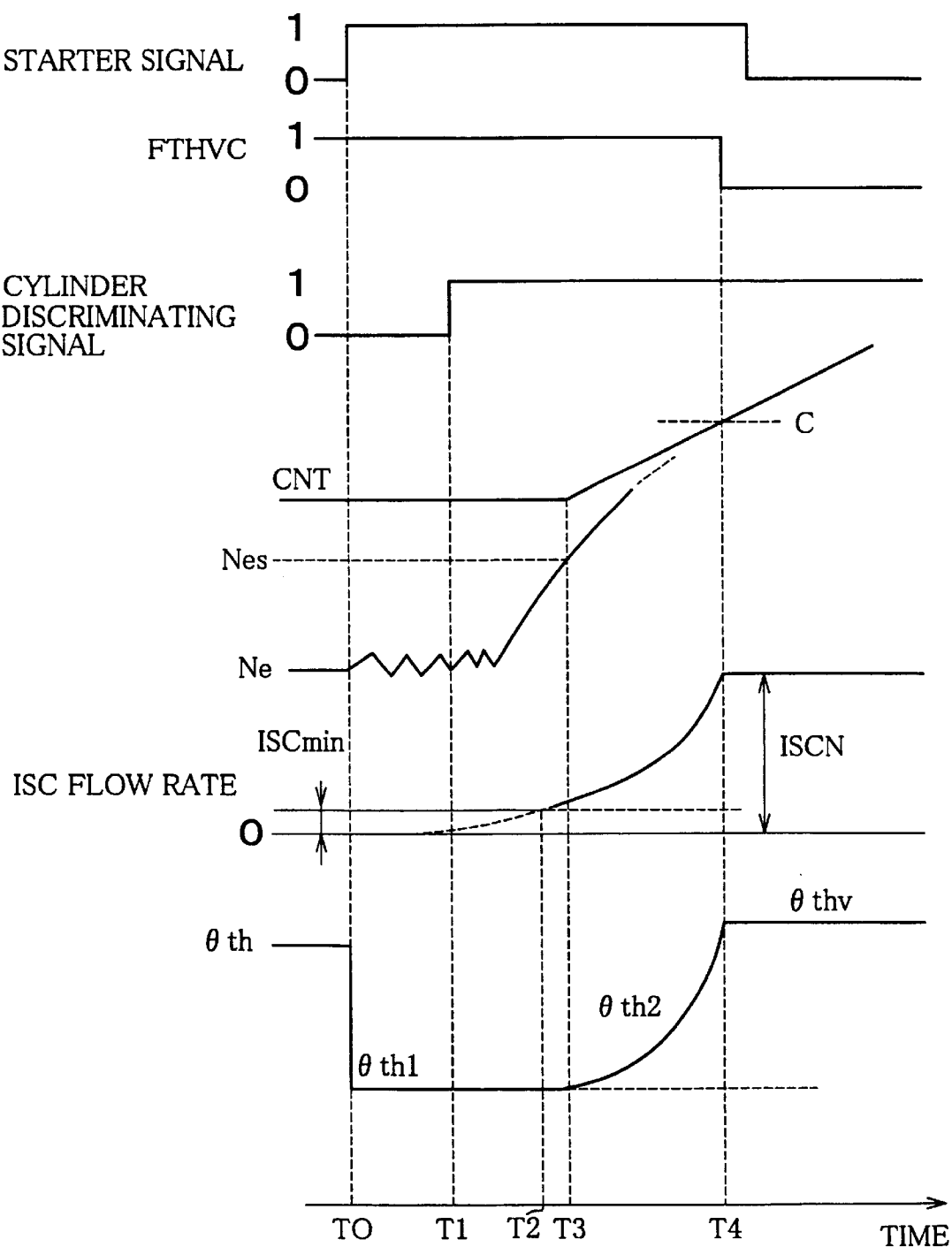
FIG. 24 is a time chart showing how the starter signal, the flag for performing the closing control of the throttle valve, a cylinder discriminating signal, a post-engine-starting counter, the engine rotational speed, a flow rate of ISC, and the opening degree of the throttle valve change.

FIG. 24 is a time chart showing how the starter signal, the throttle valve closing control performing flag FTHVC, the cylinder discrimination signal, the post-engine-starting counter CNT, the engine Ne, the ISC flow rate and the throttle opening degree θth change.

If the starter signal assumes a value of 1 at a time T0 and the engine is started when the throttle valve closing control performing flag FTHVC is set to "1", the throttle opening degree θth is set to a first opening degree θth1. This is because the cylinder discrimination signal assumes a value of 0 at this moment. After that, while the engine is being cranked until a time T1, air flows at the minimum required ISC flow rate ISCmin with the throttle valve 3 being at the opening degree θth1, that is, being almost completely closed.

If discrimination of the cylinders is carried out at a time T1 while the engine is being cranked, the minimum required ISC flow rate ISCmin is compared with the transitional air amount ISCN×R. Because ISCmin≧ISCN×R until the time T2, the throttle opening degree is set to an opening degree θth1 for the minimum ISC flow rate ISCmin. On the other hand, if ISCmin<ISCN×R at the time T2, the throttle opening degree is set to an opening degree θth2 for the transitional air amount ISCN×R.

In this example, the cranking is continued for a predetermined length of time from the time T0, and the engine is started at a time that is later than the time T1 and earlier than the time T2. After the engine has been started, the engine rotational speed Ne rises. If the engine rotational speed Ne reaches a predetermined rotational speed Nes at a time T3 that is later than the time T2, the post-engine-starting counter CNT starts its counting operation.

After the time T2, as described with reference to FIG. 22, the throttle opening degree θth2 gradually increases in accordance with an increase in transitional coefficient R. Thus, the ISC flow rate also increases correspondingly and gradually approaches the normal ISC flow rate ISCN.

Referring to FIG. 24, when the post-engine-starting counter CNT reaches a predetermined value C at a time T4 and the throttle valve closing control performing flag FTHVC is set to zero, the throttle opening degree θth2 increases due to an increase in the transitional coefficient R. By this moment, the ISC flow rate has also become close to the normal ISC flow rate ISCN. If the value of the post-engine-starting counter CNT is thus set to the predetermined value C at a time close to the time when the ISC flow rate becomes close to the normal ISC flow rate ISCN due to an increase in throttle opening degree θth2, since the throttle opening degree θth2 upon termination of the opening control of the throttle valve is close to a throttle opening degree θthv obtained through a normal calculation formula, it is possible to prevent an amount of intake air from changing greatly at the time of transition from the opening control to the closing control of the throttle valve.

Next, scavenge control of the present invention, which is performed when the engine fails to be started, will be described.

Figure 25:
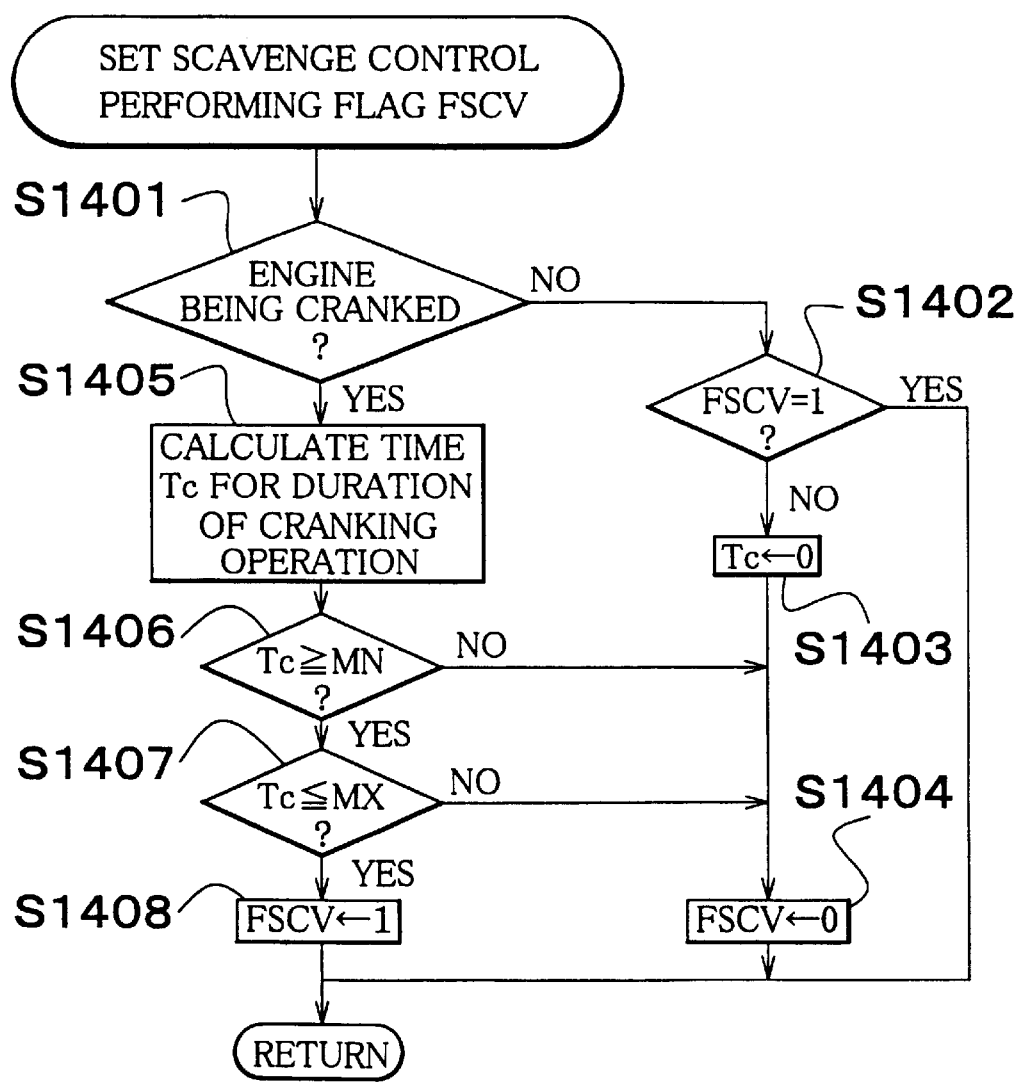
FIG. 25 is a flowchart showing how to set a flag for performing scavenge control.

FIG. 25 is a flowchart showing a procedure of setting a scavenge control performing flag FSCV in the internal combustion engine 1. The routine shown in this flowchart is also carried out at intervals of a predetermined length of time, for example, several milliseconds, in the initial routine only when the engine 1 is started. The scavenge control is performed when the engine does not start operating even if it is cranked by the starter 19 after the throttle valve 3 has been completely closed because of the turning-on of the ignition switch 17. For example, if the engine 1 does not start operating even though it has been cranked for a long time during a cold starting process thereof, an excessive amount of fuel that has continuously been injected from the fuel injection valve 8 accumulates in the combustion chamber, which makes it difficult to start the engine. In this case, the fuel thus accumulated may be ignited and excessive combustion may be caused. To prevent such phenomena, the scavenge control is designed to scavenge unburnt fuel in the combustion chamber by stopping fuel injection from the fuel injection valve 8 and to thereby improve the startability of the engine. When the scavenge control performing flag FSCV is set to "1", fuel injection from the fuel injection valve 8 is stopped.

In setting the scavenge control performing flag FSCV, first of all, it is determined in step S1401 whether or not the engine is being cranked. If the engine is not being cranked, the operation proceeds to step S1402 where it is determined whether or not the scavenge control performing control FSCV has already been set to "1". This determination is made in consideration of a case where the ignition switch 17 has once been returned from the starter position when the engine does not start operating despite continuation of the cranking operation. That is, if the scavenge control performing flag FSCV is set to "1"during the first cranking operation, the ignition switch 17 is thereafter switched to the starter position again. In consideration of such a case, the value of a later-described cranking duration time Tc is not cleared. Accordingly, if it is determined in step S1402 that FSCV="1", the routine is terminated without performing any other processings.

On the other hand, if it is determined in step S1402 that FSCV="0", it is determined that the cranking operation has not been performed yet, and the operation proceeds to step S1403. In step S1403, the value of a cranking time counter is cleared and the cranking duration time Tc is set to zero. In the following step S1404, the scavenge control performing flag FSCV is set to "0". The routine is then terminated.

If it is determined in step S1401 that the engine is being cranked, the operation proceeds to step S1405 where the cranking duration time Tc is calculated using the cranking time counter. The operation then proceeds to step S1406 where it is determined whether or not the value of the cranking duration time Tc has become equal to or longer than a reference time MN. For example, the reference time MN is set to be longer than the latest time that is generally required for the engine to be started since the starting of the cranking operation. If Tc<MN in step S1406, the operation proceeds to step S1404 where the scavenge control performing flag FSCV is set to "0". The routine is then terminated. If Tc≧MN in step S1406, the operation proceeds to step S1407.

It is determined in step S1407 whether or not the cranking duration time Tc is longer than a scavenge termination time MX (=MN+L), which is obtained by adding a maximum scavenge duration time L to the reference time MN. This determination is intended to stop the scavenge control on condition that the scavenge control has lasted for the predetermined length of time L. In other words, the determination is intended to set a timing for resetting the scavenge control performing flag FSCV to "0"w. Therefore, if Tc≦MX in step S1407, the operation proceeds to step S1408 where the scavenge control performing flag FSCV is set to "1". The routine is then terminated. If Tc>MX, the operation proceeds to step S1404 where the scavenge control performing flag FSCV is set to "0". The routine is then terminated.

In this manner, the scavenge control is performed only when MN ≦ the cranking duration time Tc≦MX.

Figure 26:
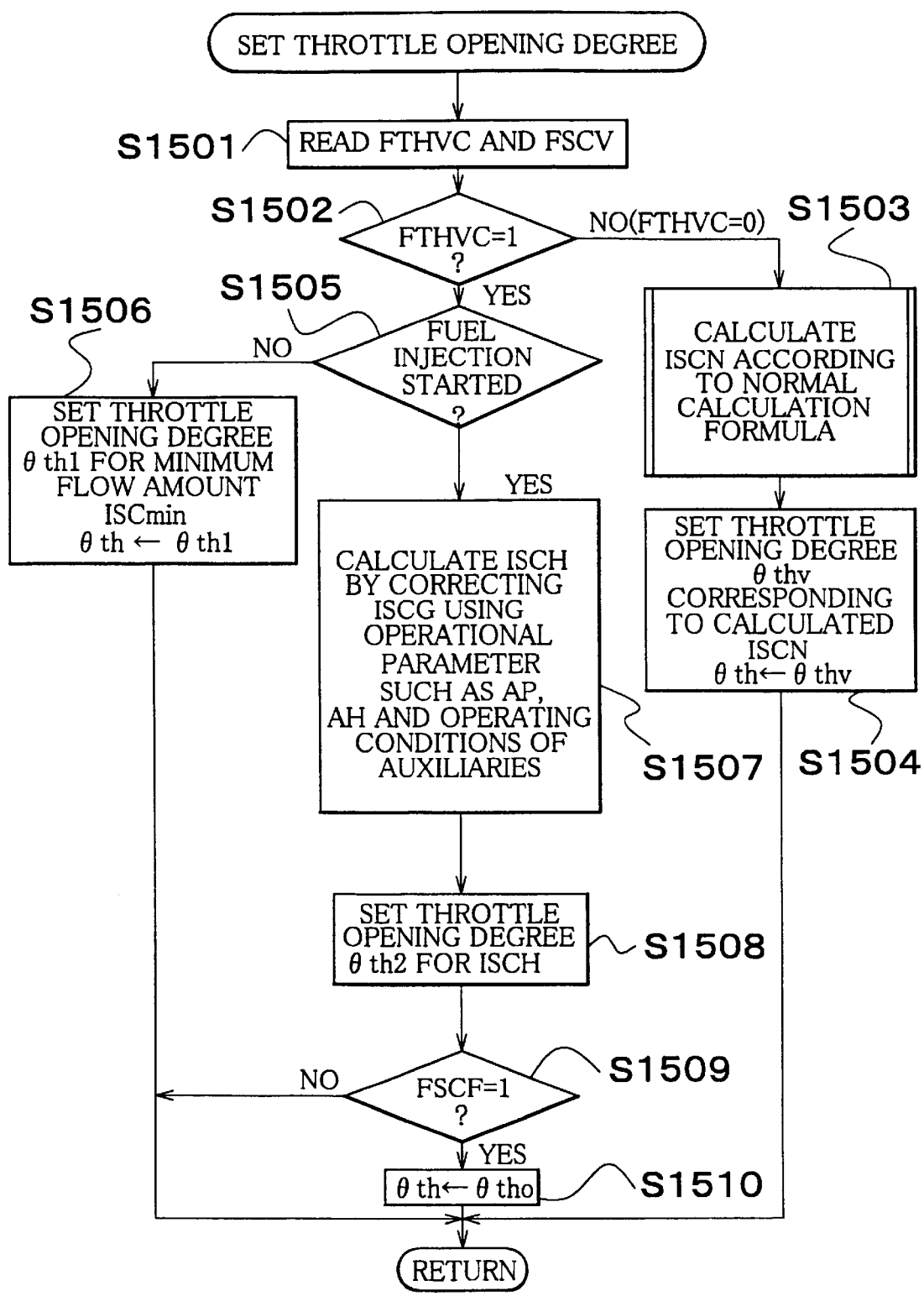
FIG. 26 is a flowchart showing how to set an opening degree of the electronically controlled throttle valve at the time of engine starting operation.

FIG. 26 is a flowchart showing a procedure of setting an opening degree of the electronically controlled throttle valve 3 when starting the engine 1. The routine shown in this flowchart is carried out at intervals of a predetermined length of time, for example, several milliseconds. As described above, it is assumed herein that the gap formed when the throttle valve 3 is at its full-closure position is a gap allowing the ISC flow rate of air to flow.

First of all, in step S1501, a value of the throttle valve closing control performing flag FTHVC and a value of the scavenge control performing flag FSCV are read. In the following step S1502, it is determined whether or not the throttle valve closing control performing flag FTHVC has been set to "1".

If it is determined in step S1502 that the throttle valve closing control performing flag FTHVC has been set to "0", it is determined that the engine 1 has already been started. The operation then proceeds to step S1503 where a normal ISC flow rate ISCN is calculated. In the following step S1504, a throttle opening degree θthv corresponding to the normal ISC flow rate ISCN is set as the opening degree θth of the throttle valve. The routine is then terminated.

If it is determined in step S1502 that the throttle valve closing control performing flag FTHVC has been set to "1", it is determined that the engine 1 is being started. The operation then proceeds to step S1505 where it is determined whether or not fuel injection has been started with intake air being sucked into the combustion chamber of the engine 1.

If intake air is being sucked into the combustion chamber but fuel injection has not been carried out yet, the operation proceeds to step S1506 where a throttle opening degree θth1 for a minimum ISC flow rate ISCmin is set as the opening degree of the throttle valve. The routine is then terminated.

If it is determined in step S1505 that fuel injection has been started, the operation proceeds to step S1507. In step S1507, a learning value ISCG of the ISC flow rate at the time of idling stored in the RAM 104 of the ECU 10, an atmospheric pressure AP detected by the atmospheric pressure sensor 18, an atmospheric pressure correction factor AH stored in the ROM 103 of the ECU 10, and operational state parameters of auxiliaries such as an air-conditioner and electrical loads installed in the engine 1 are read. The learning value ISCG of the ISC flow rate at the time of idling is corrected based on those operational state parameters so as to calculate an ISC flow rate ISCH.

In the following step S1508, a throttle opening degree θth2 for the calculated ISC flow rate ISCH is set as the opening degree θth of the throttle valve. The operation then proceeds to step S1509.

It is determined in step S1509 whether or not the value of the scavenge control performing flag FSCV read in step S1509 is "1". If the scavenge control performing flag FSCV has been set to "0", it is determined that the scavenge control has not been performed. The routine is then terminated.

If the scavenge control performing flag FSCV has been set to "1" in step S1510, it is determined that the scavenge control has been performed. The operation then proceeds to step S1510.

In step S1510, the throttle valve opening degree θth is set to a great opening degree θth0 such that the opening degree of the throttle valve 3 increases during the scavenge control and a large amount of intake air flows toward the combustion chamber. The opening degree θth0 can be set to an opening degree for completely opening the throttle valve 3. In this manner, according to the present invention, in the engine 1 wherein the closing control of the throttle valve is performed at the time of engine starting operation, if the scavenge control is performed with the engine 1 not being started, the opening control of the throttle valve is stopped and the throttle valve is opened widely. Therefore, the scavenge control is performed smoothly.

Figure 27:
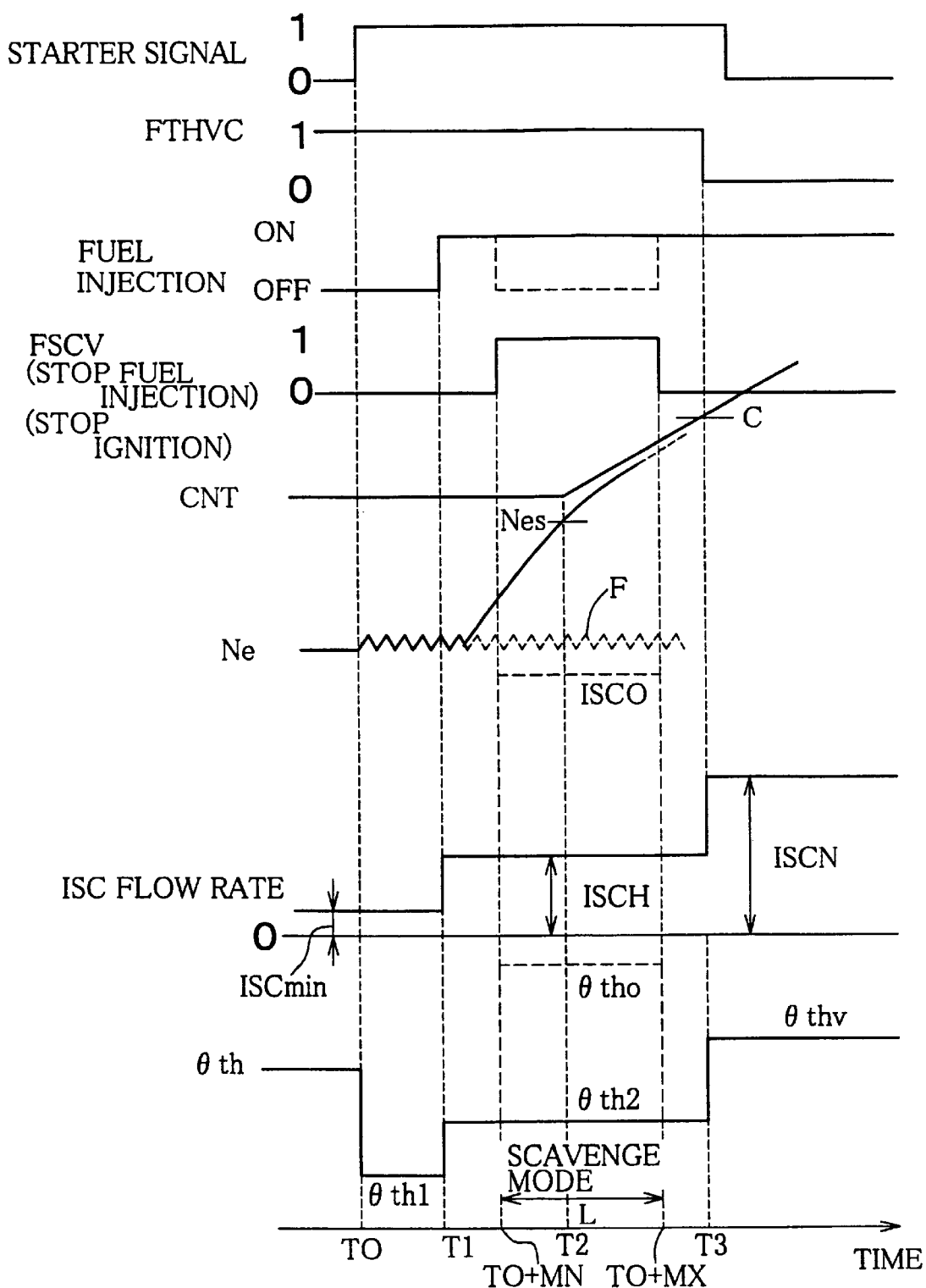
FIG. 27 is a time chart showing how the starter signal, the flag for performing the closing control of the throttle valve, a fuel injection state, the flag for performing scavenging operation, the post-engine-starting counter, the engine rotational speed, the flow rate of ISC, and the opening degree of the throttle valve change.

FIG. 27 is a time chart showing how the starter signal, the throttle valve closing control performing flag FTHVC, the fuel injection, the scavenge control performing flag FSCV, the engine rotational speed Ne, the ISC flow rate and the throttle valve opening degree θth change.

When the throttle valve closing control performing flag FTHV is set to "1", even if the starter signal has assumed a value of 1 and the engine 1 has been started, fuel injection has not been carried out yet in the engine 1. Therefore, the throttle opening degree θth is set to a first opening degree θth1. After that, while the engine is being cranked until a time T1, air flows at the minimum required ISC flow rate ISCmin with the throttle valve 3 being at the opening degree θth1, that is, being almost completely closed.

If fuel injection is carried out at the time T1 when the engine 1 is being cranked, the learning value ISCG of the ISC flow rate at the time of idling is read out from the RAM 104 and corrected by means of the operational state parameters of the engine 1 so as to calculate an ISC flow rate ISCH. The opening degree θth of the throttle valve 3 for the ISC flow rate ISCH is then set to an opening degree θth2.

If the engine 1 has been started normally in this state, the rotational speed Ne of the engine starts increasing as indicated by a solid line after continuation of the cranking operation for a predetermined length of time since the time T1. If the engine rotational speed Ne reaches a predetermined rotational speed Nes at a time T2 which is later than the time T1, the post-engine-starting counter CNT starts its counting operation. In this state, the ISC flow rate ISCH of air flows with the throttle valve 3 being at the opening degree θth2, that is, being almost completely opened. After that, if the post-engine-starting counter CNT reaches a predetermined value C at a time T3, the throttle valve closing control performing flag FTHVC is set to "0"and the ISC flow rate is calculated through a normal calculation formula. The throttle opening degree θth is set to a throttle opening degree θthv corresponding to the normal ISC flow rate that has been calculated, and the ISC flow rate of air flows correspondingly.

On the other hand, if the engine 1 fails to be started normally in a fuel injection state wherein the opening degree θth of the throttle valve 3 is set to the opening degree θth2, the cranking operation is continued as indicated by a broken line F even after the time T1 and the rotational speed Ne of the engine does not increase. In this state, the scavenge performing flag FSCV is set to "1" at a time (T0+MN) when a reference time MN has elapsed since the time T0 corresponding to the starting of the cranking operation. If the scavenge performing flag FSCV is set to "1", fuel injection is stopped as indicated by a broken line, and ignition cut-off operation for the ignition plug in the combustion chamber is performed.

In this manner, if the scavenge performing flag FSCV is set to "1" at the time (T0+MN) and a scavenge mode for performing scavenge control is entered, the throttle opening degree θth is set to an opening degree θtho as indicated by a broken line. When the throttle valve 3 is at the opening degree θtho, the throttle valve 3 is completely opened or almost completely opened. As a result, after the time (T0+MN), a large amount ISCO of intake air indicated by the broken line flows as an ISC flow rate. This scavenge mode is canceled at the time (T0+MX) when the scavenge control has lasted for the predetermined length of time L (It is to be noted herein that MX=MN+L).

After the scavenge mode has been canceled, the throttle opening degree θth is reset to the original opening degree θth2, and the normal control is performed. Thus, according to this embodiment, when the scavenge control is performed during the closing control of the throttle valve at the time of engine starting operation, the throttle valve 3 is completely opened temporarily. Therefore, there is no obstacle to the scavenge control.

In the control shown in FIG. 26, if the scavenge performing flag FSCV is set to "1", fuel injection is stopped and the ignition process by the ignition plug in the combustion chamber is also stopped.

Figure 28:
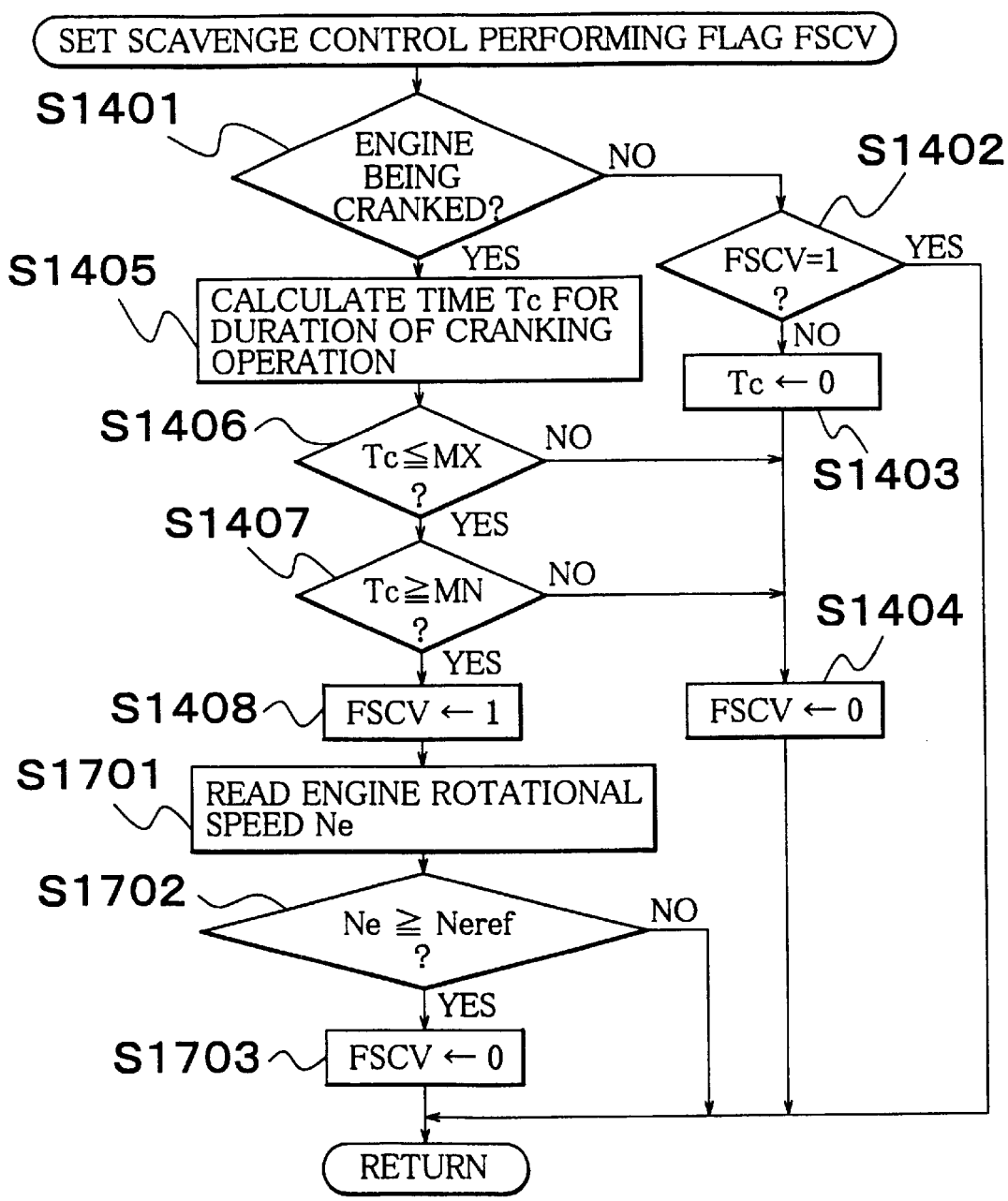
FIG. 28 is a flowchart showing how to set an opening degree of the electronically controlled throttle valve at the time of engine starting operation according to a second embodiment of the present invention.

However, in the case where the scavenge performing flag FSCV has been set to "1", even if fuel injection is stopped, there is no need to perform an ignition cut-off operation by means of the ignition plug in the combustion chamber. FIG. 28 shows how to perform control in such a case.

As soon as the air-fuel ratio in the combustion chamber becomes suitable in the scavenge mode, fuel in the combustion chamber may be ignited and the engine 1 may be started. In this case, since the throttle valve 3 is completely open or almost completely open in the scavenge mode, there is a possibility that the engine rotational speed Ne may rise abruptly. The control shown in FIG. 28 is intended to prevent the engine rotational speed Ne from rising excessively due to the starting of the engine 1 in the scavenge mode.

In the control shown in FIG. 28, a procedure of preventing the engine rotational speed Ne from rising excessively is added to the procedures of setting the scavenge performing flag FSCV that have been described with reference to steps S1401 to S1408 in FIG. 26. Therefore, the procedures in steps S1401 through S1408 will not be described hereinafter.

In the control shown in FIG. 28, after the scavenge performing flag FSCV has been set to "1" in step S1408, an engine rotational speed Ne is read in step S1701. In the following step S1702, it is determined whether or not the engine rotational speed Ne has become equal to or higher than a reference rotational speed Neref. If the engine rotational speed Ne is lower than the reference rotational speed Neref, it is determined that the engine has not been started yet. The routine is then terminated without performing any other processings. If the engine rotational speed Ne has become equal to or higher than the reference rotational speed Neref in step S1702, it is determined that the engine has been started. The operation then proceeds to step S1703 where the scavenge performing flag FSCV is set to "0" so as to cancel the scavenge mode. This control ensures that the engine rotational speed Ne does not rise excessively even if the engine has been started in the scavenge mode.

Figure 29:
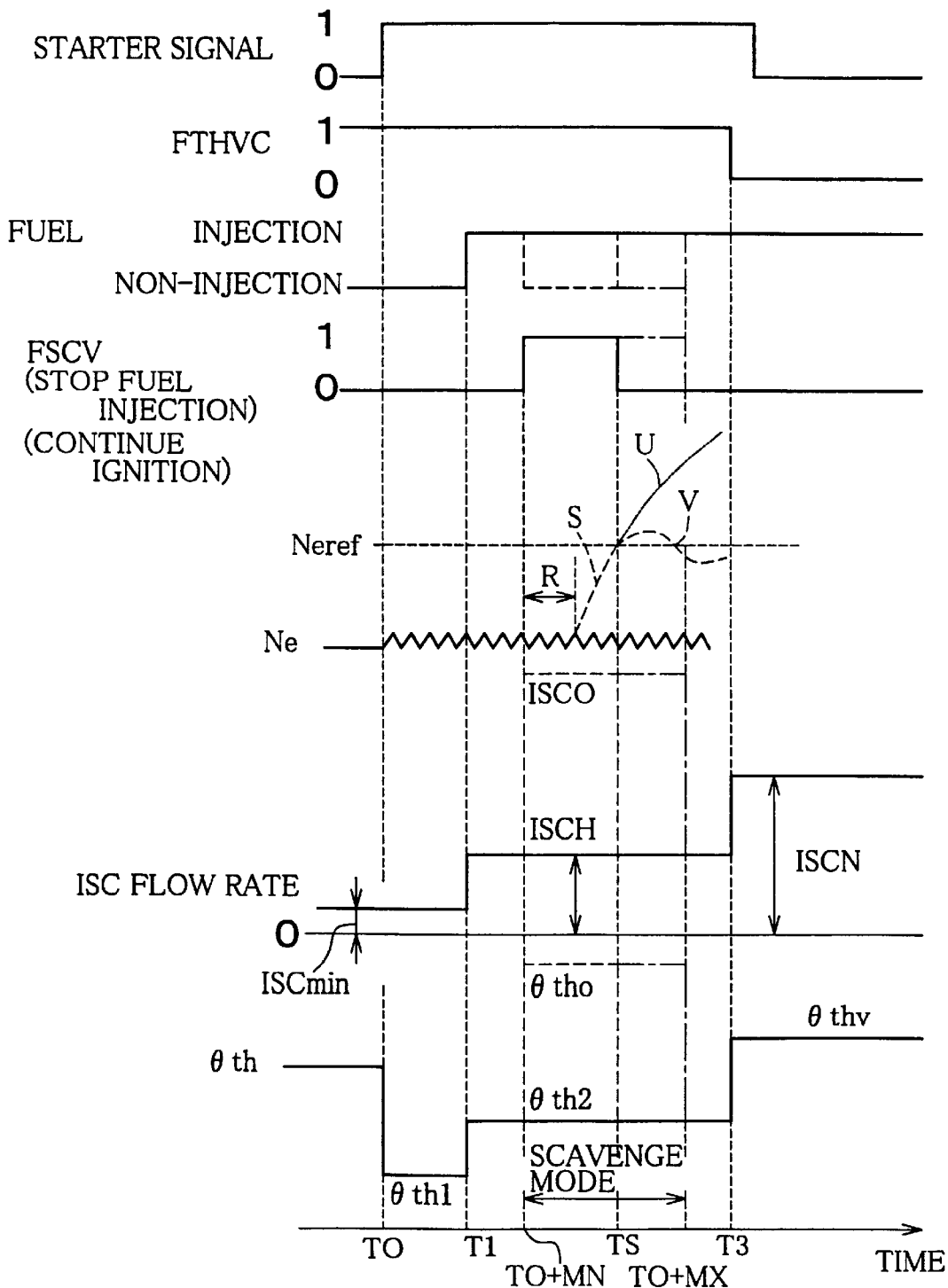
FIG. 29 is a time chart showing how the starter signal, the flag for performing the closing control of the throttle valve, the fuel injection state, the flag for performing scavenging operation, the post-engine-starting counter, the engine rotational speed, the flow rate of ISC, and the opening degree of the throttle valve change.

FIG. 29 is a time chart showing how the starter signal, the throttle valve closing control performing flag FTHVC, the fuel injection, the scavenge performing flag FSCV, the post-engine-starting counter CNT, the engine rotational speed Ne, the ISC flow rate and the throttle opening degree θth change when performing the control shown in FIG. 28.

From a time T0 to a time (T0+MN), the starter signal, the throttle valve closing control performing flag FTHVC, the state of fuel injection, the scavenge performing flag FSCV, the engine rotational speed Ne, the ISC flow rate and the throttle opening degree θth change in the same manner as in FIG. 27. In FIG. 27, since the engine rotational speed Ne does not increase after the time (T0+MN), the scavenge mode is continued until the time (T0+MX).

Referring to FIG. 29, however, the engine 1 is started in the scavenge mode after a predetermined length of time R has elapsed since the time (T0+MN), and the engine rotational speed Ne increases as indicated by a broken line S and reaches the reference rotational speed Nref at a time TS. If the scavenge mode is continued in this state, the engine rotational speed Ne may increase excessively as indicated by an alternate long and two short dashes line U. Therefore, the scavenge performing flag FSCV is set to "0" at the time TS.

In this manner, if the scavenge performing flag FSCV has been set to "1" and the engine 1 has been started in the scavenge mode wherein the scavenge control is performed, the throttle opening degree θth is reset from the opening degree θtho to the opening degree θth2. Therefore, the ISC flow rate is also returned to the original flow rate ISCH, so that the engine rotational speed Ne is prevented from rising as indicated by a broken line V.

As described hitherto, in the case where scavenge control is performed in a multi-cylinder internal combustion engine wherein the closing control of the throttle valve is performed at the time of engine starting operation, the opening control of the throttle valve is canceled temporarily. Hence, the scavenge control is performed smoothly, and it is possible to enhance the startability of the engine and prevent concentrations of emission substances from becoming high through the closing control of the throttle valve, while performing the scavenge control.

The present invention can effectively be applied not only to a case where the electronically controlled throttle valve 3 closes the intake passage of the internal combustion engine but also to a case where an electronically controlled intake control valve is separately provided in the intake passage of the internal combustion engine.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. An intake air control system for controlling an amount of air supplied to an internal combustion engine by adjusting an opening degree of an electronically controlled throttle valve provided in an intake passage of the internal combustion engine, comprising:
   a throttle valve controller that closes the electronically controlled throttle valve to its full-closure position when an ignition switch of the internal combustion engine is turned on and opens the throttle valve after air has been sucked into the internal combustion engine; and
   an air amount determiner that determines an amount of air used for combustion in the internal combustion engine, wherein:
   the throttle valve controller opens the throttle valve to a predetermined opening degree when the amount of air reaches a predetermined amount.

2. The intake air control system according to claim 1, wherein the predetermined amount is a volume in the intake passage downstream of the throttle valve.

3. The intake air control system according to claim 1, wherein the air amount determiner determines the amount of air based on a cumulative value of amounts of air sucked into a combustion chamber of the internal combustion engine.

4. The intake air control system according to claim 3, wherein the air amount determiner calculates a cumulative value of amounts of intake air based on a volume of the combustion chamber of the internal combustion engine, an engine rotational speed, and a volumetric efficiency corresponding to the engine rotational speed.

5. The intake air control system according to claim 4, wherein the air amount determiner corrects the cumulative value of the amounts of intake air in accordance with a temperature of intake air.

6. The intake air control system according to claim 1, wherein the air amount determiner determines the amount of air after lapse of a predetermined length of time since starting of the engine.

7. The intake air control system according to claim 1, further comprising:
   an engine rotational speed detector that detects a rotational speed of the engine; and
   an engine rotational speed change amount determiner that determines an engine rotational speed change amount based on the detected engine rotational speed, wherein
   the throttle valve controller opens the throttle valve regardless of the amount of air when the engine rotational speed change amount is greater than a predetermined change amount which is a negative value.

8. The intake air control system according to claim 7, wherein the predetermined change amount is set in accordance with a coolant temperature of the engine.

9. The intake air control system according to claim 8, wherein an absolute value of the predetermined change amount is so set as to increase in accordance with a decrease in coolant temperature of the engine.

10. The intake air control system according to claim 9, wherein the throttle valve controller gradually opens the throttle valve to a predetermined opening degree.

11. The intake air control system according to claim 8, wherein the throttle valve controller gradually opens the throttle valve to a predetermined opening degree.

12. The intake air control system according to claim 1, wherein the throttle valve controller gradually opens the throttle valve to a predetermined opening degree.

13. The intake air control system according to claim 1, further comprising:
   an engine rotational speed detector that detects a rotational speed of the engine;
   a load factor determiner that determines a load factor of the internal combustion engine based on the engine rotational speed and an opening degree of the throttle valve; and
   an injection amount determiner that determines, based on the load factor, an amount of fuel to be injected to the internal combustion engine for a period from closing of the throttle valve to its full-closure position to attainment of a predetermined rotational speed by the engine rotational speed.

14. The intake air control system according to claim 1, wherein the full-closure position is a position where the throttle valve is spaced apart from the intake passage by a predetermined distance, and further comprising:
   a first calculator that calculates a transitional coefficient from an amount of intake air existing in a volume of the intake passage ranging from a downstream-side of the throttle valve to an inlet of each cylinder of the internal combustion engine and from a consumption ratio of intake air amount determined based on the amount of air;

a second calculator that calculates a transitional air amount from an amount of intake air required after termination of a closing operation by the throttle valve and from the transitional coefficient; and a second throttle valve controller that opens the throttle valve to the greater one of an opening degree of the throttle valve for the transitional air amount and an opening degree of the throttle valve at the full-closure position.

15. The intake air control system according to claim 14, wherein the second throttle valve controller stops operating after lapse of a predetermined length of time since starting of the engine.

16. The intake air control system according to claim 1, further comprising a scavenger that scavenges unburnt fuel in the combustion chamber by stopping fuel injection while the internal combustion engine is being cranked, wherein the throttle valve controller stops closing control of the throttle valve in starting the engine while the scavenger performs scavenging operation.

17. The intake air control system according to claim 16, wherein the throttle valve controller resumes the closing control when the engine rotational speed during the scavenging operation has exceeded a predetermined rotational speed.

18. The intake air control system according to claim 16, wherein the scavenger performs scavenging operation when a cranking time of the internal combustion engine has exceeded a predetermined length of time.

19. The intake air control system according to claim 16, wherein the throttle valve controller opens the throttle valve to its full-admission state when stopping the closing control.

20. The intake air control system according to claim 1 further comprising a detector that detects an required opening degree of the throttle valve, wherein the throttle valve controller closes the throttle valve to its full-closure position when the required opening degree is less than a first opening degree, and wherein the throttle valve controller opens the throttle valve to a predetermined position corresponding to an opening degree required for a first-idle of the internal combustion engine when the required opening degree is equal to the first opening degree or between the first opening degree and a second opening degree, and wherein the throttle valve controller opens the throttle valve in accordance with the required amount when the required opening degree is equal to or greater than the second opening degree.

* * * * *